(12) United States Patent
Nogueira

(10) Patent No.: US 7,404,920 B2
(45) Date of Patent: Jul. 29, 2008

(54) MOLDING-SYSTEM CLAMP ASSEMBLY

(75) Inventor: Joaquim Martins Nogueira, Everett (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 137 days.

(21) Appl. No.: 11/367,480

(22) Filed: Mar. 6, 2006

(65) Prior Publication Data
US 2007/0207235 A1 Sep. 6, 2007

(51) Int. Cl.
*B29C 45/64* (2006.01)
(52) U.S. Cl. .................. 264/328.1; 425/595; 425/451.9
(58) Field of Classification Search ................. 425/595, 425/451.9; 264/328.1
See application file for complete search history.

(56) References Cited

U.S. PATENT DOCUMENTS

| | | | | |
|---|---|---|---|---|
| 3,587,138 | A | * | 6/1971 | Bammert et al. ............. 425/595 |
| 3,656,877 | A | * | 4/1972 | Aoki ........................... 425/590 |
| 5,368,463 | A | * | 11/1994 | Kassner et al. .............. 425/595 |
| 5,753,153 | A | | 5/1998 | Choi |
| 5,853,773 | A | | 12/1998 | Choi |
| 5,922,372 | A | | 7/1999 | Schad |
| 6,200,123 | B1 | * | 3/2001 | Mailliet et al. .............. 425/595 |
| 6,250,905 | B1 | | 6/2001 | Mailliet et al. |
| RE37,827 | E | | 9/2002 | Schad |
| 6,468,449 | B1 | | 10/2002 | Fujikawa |
| 2005/0287246 | A1 | | 12/2005 | Looije |

FOREIGN PATENT DOCUMENTS

WO    WO 93/16828    *   9/1993

* cited by examiner

*Primary Examiner*—James Mackey

(57) ABSTRACT

A molding-system clamp assembly of a molding system is disclosed, and includes a clamp piston, and a clamp ram, the clamp ram and the clamp piston each including inter-meshable structures to selectively inter-mesh the clamp piston to the clamp ram, in the unmeshed position the clamp piston and the clamp ram do not inter-mesh relative to each other, and inter-abuttable structures to selectively inter-abut the clamp piston relative to the clams ram, the inter-abuttable structures having an interposing body abuttable against the clamp ram and the clamp piston, the inter-abuttable structures to abut with each other so that the clams piston makes contact with the interposing body, and the inter-abuttable structures to transfer a mold-break force so that the mold-break force is applied from the clamp piston against the interposing body, and in response the mold-break force is transferred from the clamp piston through the interposing body and to the clamp ram, and once mold break has occurred, the clamp piston is deactivated so that the mold may be opened.

12 Claims, 18 Drawing Sheets

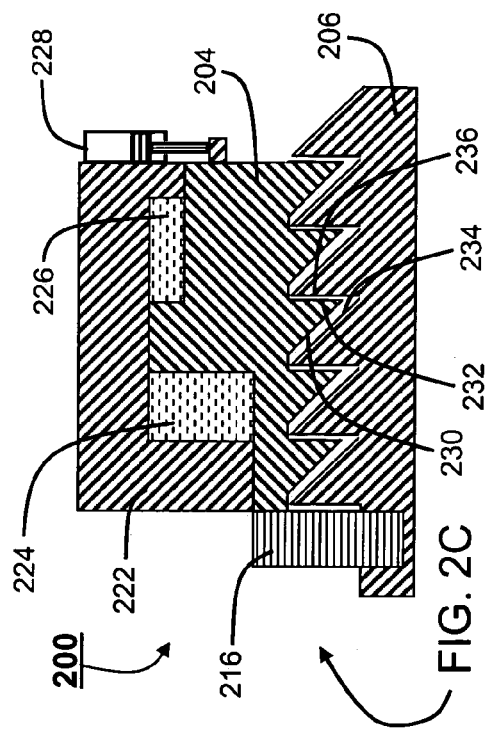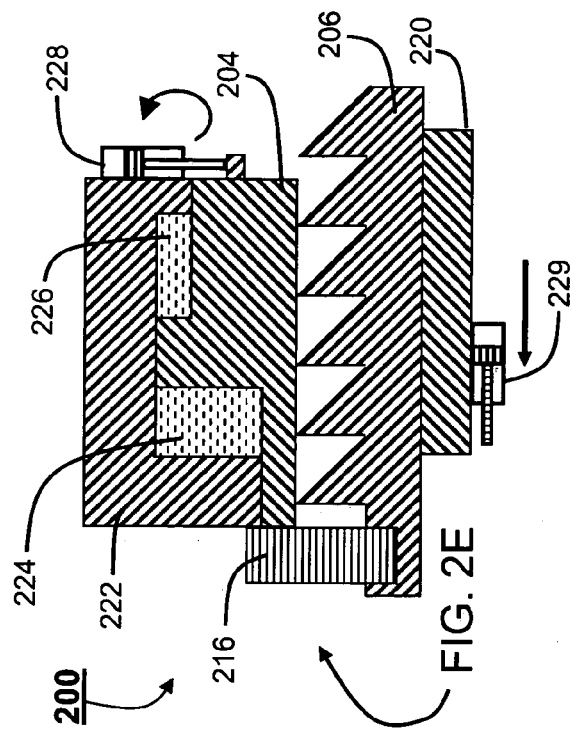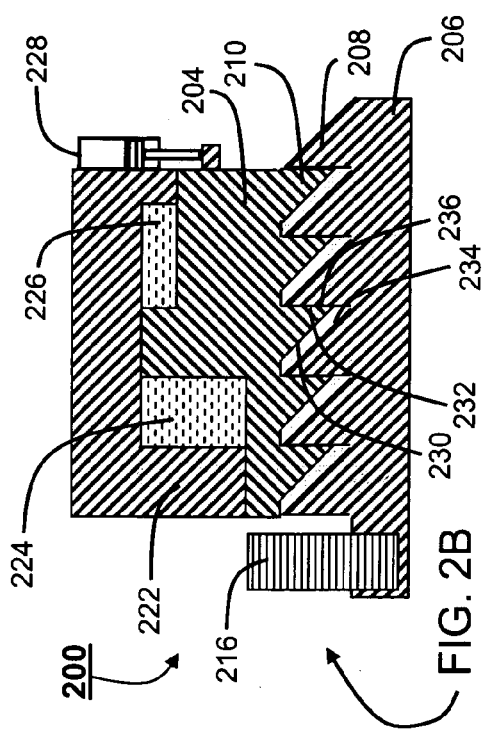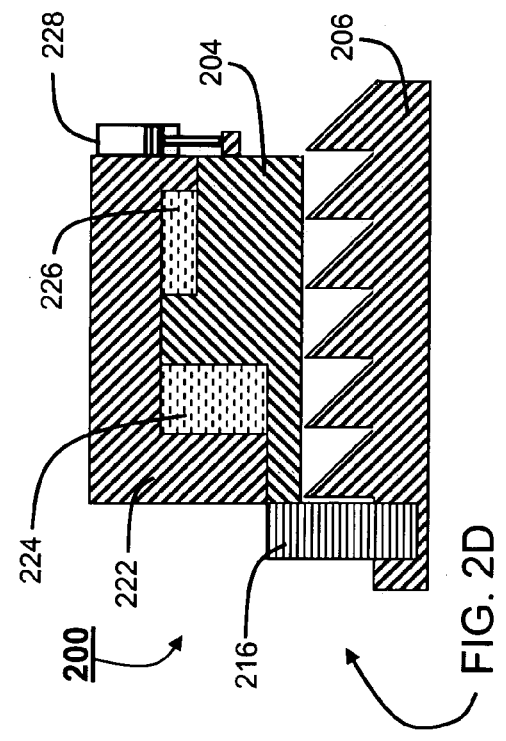

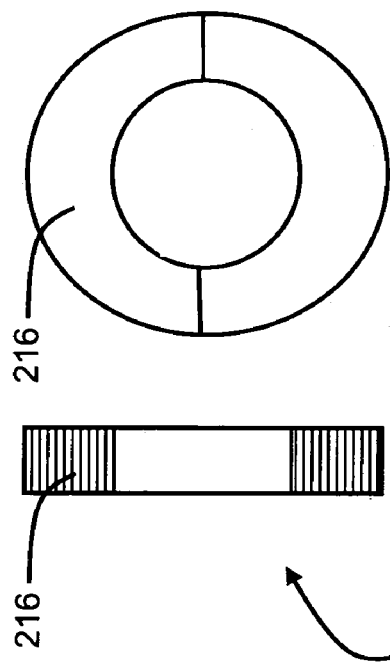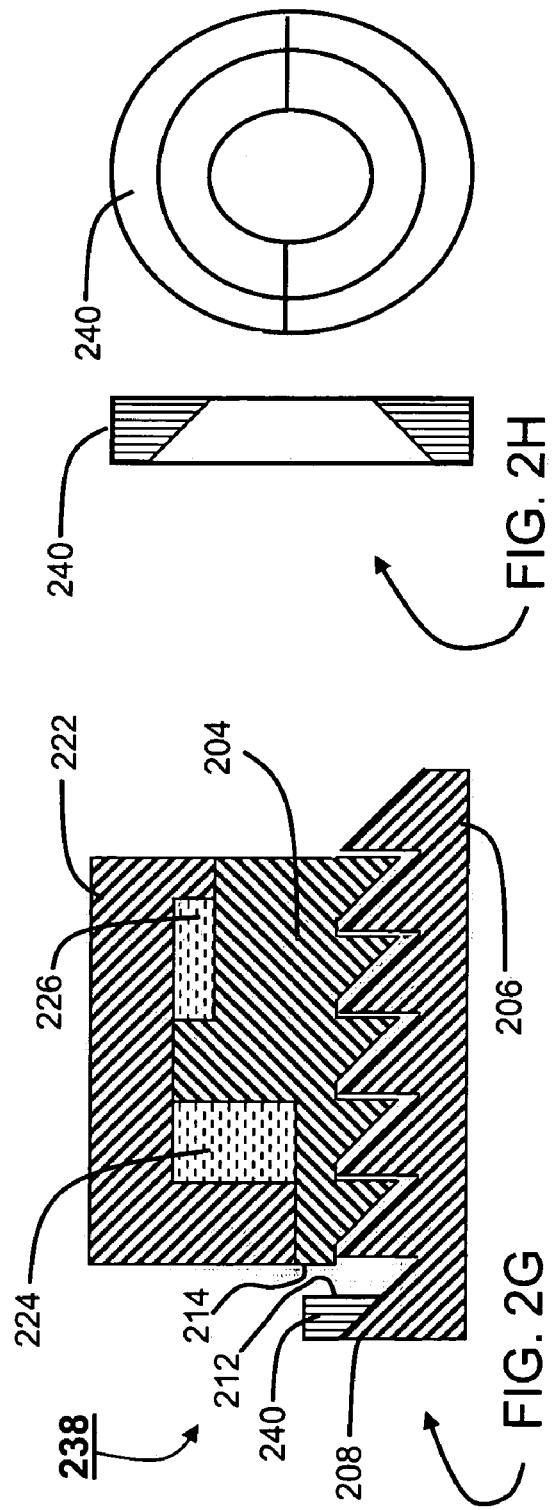

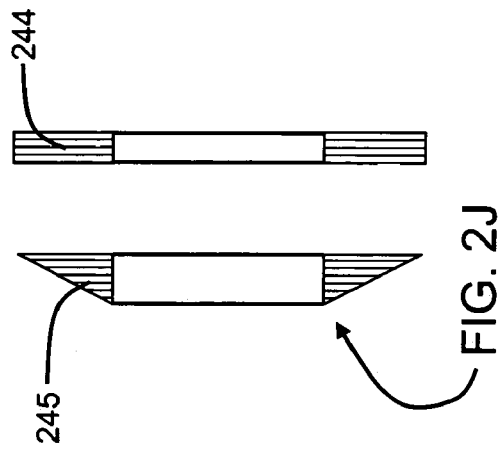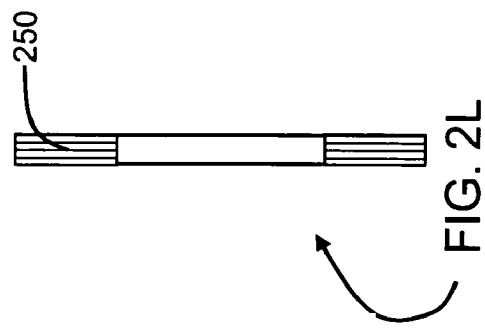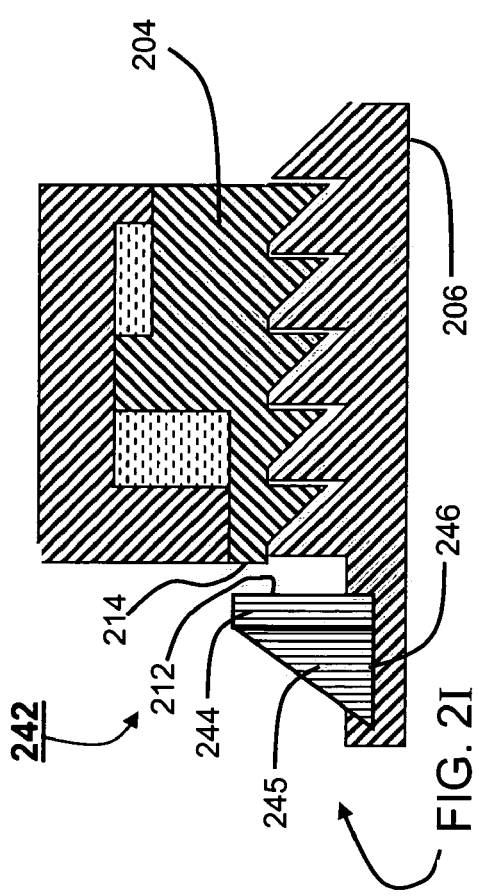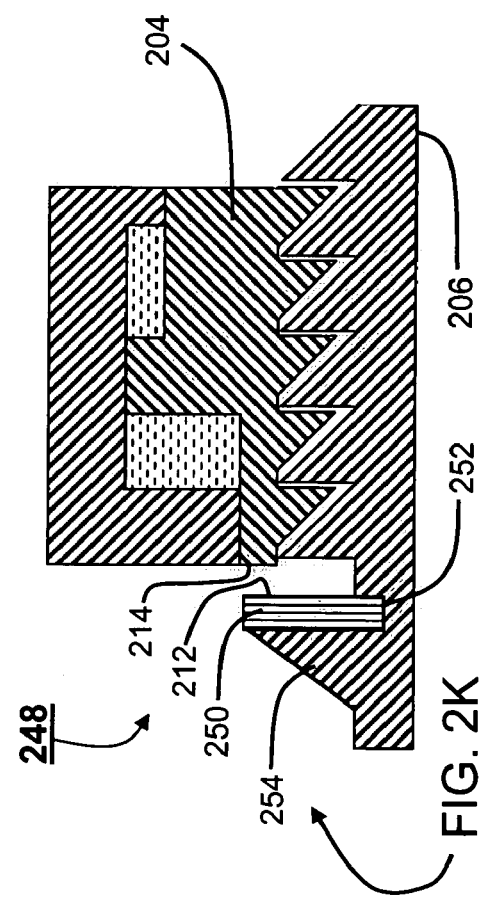

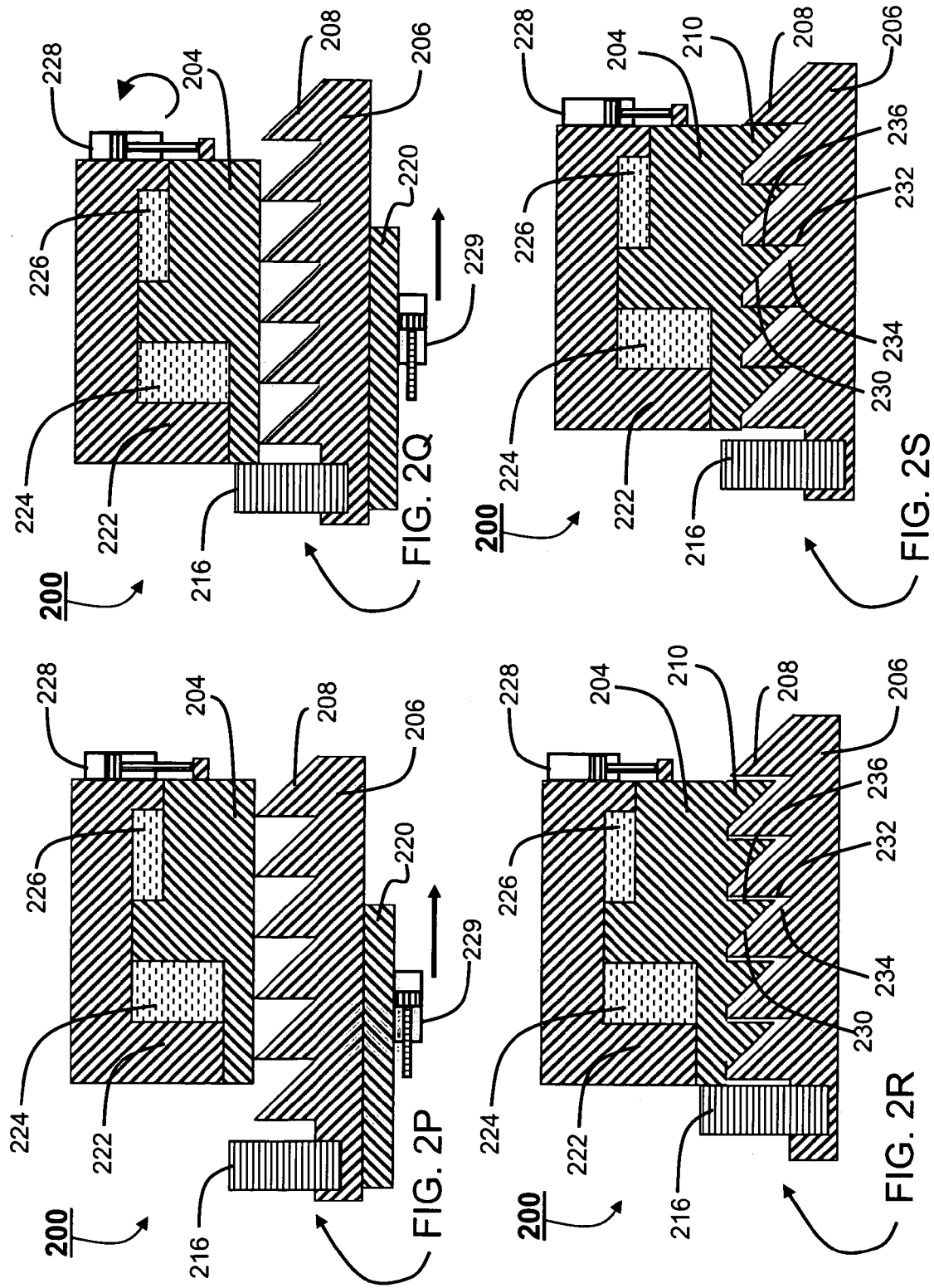

MOLDING-SYSTEM CLAMP ASSEMBLY

TECHNICAL FIELD

The present invention generally relates to molding systems, and more specifically the present invention relates to, but is not limited to, a molding-system clamp assembly (amongst other things).

BACKGROUND

U.S. Pat. No. 3,587,138 (Inventor: Bammert et al; Assignee: Schloemann, Germany) discloses a mold-closing device that includes a four-column hydraulic press usable in an injection-molding machine, in which a movable mold-carrying plate is slidable along a column of the press and is also releasably lockable on the column.

U.S. Pat. No. 5,853,773 (Inventor: Choi; Assignee: Husky Injection Molding Systems Limited, Canada) discloses a system and a process for controlling mold activity of a molding machine by using a clamping device for positioning a movable-mold platen on a carrier device for engaging the movable-mold platen with another platen, and for sustaining forceful engagement of the movable-mold platen with the another platen and the carrier device, and for breaking the movable-platen from the another platen and the carrying device. The movable-mold platen includes a movable-mold half and the another platen includes another mold half. Also disclosed is a way for determining an adjustable starting position of the clamping device and the movable-mold platen. Also disclosed is a way for achieving greater accuracy of an adjustable starting position for the clamping device and the movable platen. The way for adjusting the starting position includes a mechanism for actuating the clamping device. Also disclosed is a device for monitoring and controlling the position of the clamping device and the movable platen. Also disclosed is a mechanism for sustaining the clamp-up force at a prescribed level.

U.S. Pat. No. 5,922,372 (Reissued as U.S. Pat. No. RE. 37,827; Inventor: Schad; Assignee: Husky Injection Molding Systems Limited, Canada) discloses a clamping system for use with platens of a molding machine. The molding machine includes a stationary platen having a first mold half affixed thereto and also includes a movable platen having a second mold half affixed thereto. The movable platen travels along a plurality of tie bars and reciprocatively moves between a mold-open position and mold-closed position. The clamping system is used for applying a clamping force to the movable platen.

U.S. Pat. No. 6,468,449 (Inventor: Fujikawa; Assignee: Sodick Company Limited, Japan) discloses an injection molding machine that includes a mold-clamping device. The mold-clamping device includes an electromechanical mold opening and closing mechanism, a hydraulic mold clamping mechanism, and a mold thickness adjustment device. The mold thickness adjustment device includes a first-detection device for detecting the position of a mold-clamping ram, a second-detection device for optically detecting the position of a half nut device, and a mold clamping ram position control device for hydraulically holding and controlling the position of the mold-clamping ram. The position of the half nut device is held by hydraulic control at the mold thickness adjustment position during mold opening and closing. In a mold opening and closing operation, the mold-clamping ram exerts a large mold opening force that is used to open the mold.

U.S. Pat. No. 5,753,153 (Inventor: Choi; Assignee: Husky Injection Molding Systems Limited, Canada) discloses a control system for clamp-up and mold break operations of tie bar clamping mechanisms, the control system determines and adjusts starting position of securing/clamping mechanism and movable mold after each molding operation to achieve greater accuracy. In a particular embodiment of the securing/clamping assemblies, the securing/clamping assembly is mounted on the outwardly facing side of movable end platen and within a bore. In order for the securing/clamping assembly of the platen to function with the tie bar, the tie bar includes an elongated end section having a plurality of spaced protrusions in the form of teeth separated by longitudinally extending inner slots. Accordingly, at the end of tie bar is a toothed outer surface. The toothed outer surface of tie bar is in the form of longitudinal outer strips of teeth extending in the axial direction of the tie bar, wherein the teeth are preferably aligned in a radial direction on the tie bar and separated by a space in the axial direction. Each of the strips of teeth such as strips of teeth is radially separated from another strip of teeth via an outer axially extending slot, such as slots. Outer strips of teeth and slots of tie bar are adapted to engage and align, respectively, with inner teeth and grooves of securing/clamping assembly in order to cause a locking engagement with the bar.

FIG. 1A is a perspective view of a known clamp assembly 100 (hereafter referred to as the "clamp assembly 100") as depicted in FIG. 3 of U.S. Pat. No. 5,922,372. The clamp assembly is sometimes referred to as a pineapple-type clamp because of its teeth arrangement.

FIG. 1B is a cross-sectional view along a longitudinal axis of the clamp assembly of FIG. 1A. The clamp assembly is used in a molding system 102. The clamp assembly is depicted in a mold-opened position. The molding system 102 includes a base 104. A stationary platen 106 is fixedly attached to the base 104. A movable platen 108 is transversally slidabe along the base 104. A stationary mold half 110 is fixedly attached to the stationary platen 106. A movable mold half 112 is fixedly attached to the movable platen 108. The mold halves 110, 112 cooperatively define a mold cavity therebetween for molding an article therein. An actuator 130 is activated to translate or stroke the movable platen 108 toward and away from the stationary platen 106 (so as to open and close the mold halves 110, 112 relative to each other). The actuator 130 includes a column 141 which is attached to the movable platen 108. Once the mold halves 110, 112 are closed against each other, the clamp assembly is actuated to apply a clamping force to the mold halves 110, 112 while the injection unit 114 injects a molding material into the mold cavity. The clamping force keeps the mold halves 110, 112 together while the molding material enters the mold cavity under pressure. Once the molding material has solidified in the mold cavity, the clamp assembly removes the clamping force and then it actuates to apply a mold-break force that is used to separate the mold halves 110, 112 apart from each other so that the molded article may then be removed from the mold halves 110, 112. Then once the mold halves 110, 112 are broken apart, the actuator 130 actuates to move (or stroke) the platens 106, 108 apart from each other.

The clamp assembly includes a clamp ram 116 and a clamp piston 118. The clamp ram 116 is attached to the column 141. The clamp ram 116 includes an inter-meshable structure 120. The clamp piston 118 includes an inter-meshable structure 142 (structure 142 is not depicted in FIG. 1B but it is depicted in FIG. 1D). The inter-meshable structures 120, 142 inter-mesh relative to each other between an unmeshed position and an inter-meshed position. FIG. 1B depicts the clamp ram 116 and the clamp piston 118 in the unmeshed position.

Sometimes the inter-meshable structures 120, 142 are referred to as "pineapple" structures.

The actuator 130 (which is sometimes referred to as a "stroke cylinder") is used to actuatably move the column 141 which then, in turn, moves the movable platen 108 to open (or separate) the mold halves 110, 112 or to close the mold halves 110, 112 relative to each other. The actuator 130 includes a rod 132 and a cylinder head 134 disposed within a chamber 136 defined by the column 141. Defined by the chamber 136 and the cylinder head 134 are a mold-opened hydraulic column 138 and a mold-closed hydraulic column 140. The actuator 130 is actuated to close the mold halves 110, 112. Preferably, the actuator 130 is slowed down just before the mold halves 110, 112 make contact with each other to ensure that the mold halves 110, 112 do not inter-collide (this is sometimes referred to as a mold-protect phase).

A housing 122 houses the clamp piston 118, and the clamp piston 118 moves relative to the housing 122. Sometimes the housing 122 is referred to as a clamp block. One way to accommodate molds of varying sizes and/or shapes is to have the housing 122 translate along the base 104 and then locking the housing 122 into a fixed position to the base 104. A clamping-hydraulic column 124 and a mold-break hydraulic column 126 are defined between the clamp piston 118 and the housing 122. An actuator 128 is attached to the housing 122 and to the clamp piston 118. The actuator 128 is used to rotate the clamp piston 118 so that the inter-meshable structure (structure 142) associated with the clamp piston 118 may inter-mesh or unmesh relative to the inter-meshable structure 120 of the clamp piston 116. It is understood that FIG. 1B shows the clamp assembly in an un-actuated condition (that is, the assembly is not yet actuated to apply a force (either clamping force or mold-break force) that is transferred over to the mold halves 110, 112).

FIG. 1C is a cross-sectional view of the clamp assembly of FIG. 1B in which the mold halves 110, 112 are positioned in the mold-closed position. The mold-closed hydraulic column 140 of the actuator 130 is energized to push the column 141 against the movable platen 108 and in response the movable platen 108 moves toward the stationary platen 106 and thus the mold halves 110, 112 are closed against each other. It is understood that FIG. 1C shows the clamp assembly in an un-actuated condition (that is, the assembly is not yet actuated to apply a force that is transferred over to the mold halves 110, 112).

FIG. 1D is a cross-sectional view of the clamp assembly of FIG. 1B in which the clamp assembly is placed in a clamp-intermeshed position. The clamp piston 118 includes an inter-meshable structure 142 that is rotated into the intermeshed position relative to the inter-meshable structure 120 of the clamp ram 116. The actuator 128 was actuated to rotate the inter-meshable structure 142 into this position. This phase of operation is called a clamp lock-up phase. It is understood that FIG. 1D shows the clamp assembly in an un-actuated condition (that is, the assembly is not yet actuated to apply a force that is transferred over to the mold halves 110, 112).

FIG. 1E is cross-sectional views of the clamp assembly 100 of FIG. 1B at subsequent phases of the clamping cycle. It is understood that FIG. 1D shows the clamp assembly in an actuated condition (that is, the assembly is actuated to apply a force that is transferred over to the mold halves 110, 112).

The upper-left corner of FIG. 1E shows the clamp assembly in a clamp-up phase (that is, the clamp assembly is actuated to apply a clamping force to the mold halves 110, 112). The clamping-hydraulic column 124 includes hydraulic oil. The clamping-hydraulic column 124 is actuated to push the piston 118 toward the mold halves 110, 112 (by having a pump device pump the hydraulic oil into the column 124). In turn, teeth of the inter-meshable structure 142 are urged to contact and then to push against the teeth of the inter-meshable structure 120. The inter-meshable 142 includes a rear-tooth portion 144 and a flank-tooth portion 146. The inter-meshable 120 includes a rear-tooth portion 148 and a flank-tooth portion 150. The clamp piston 118 pushes the flank-tooth portion 146 against the flank-tooth portion 150 and in this manner a clamping force is transferred from the clamp piston 118 over to the clamp ram 116. In turn, the clamp ram 116 transfers the clamping force over to the column 141 and then onto the mold halves 110, 112.

The upper-right corner of FIG. 1E shows the clamp assembly in a mold-break phase (that is, the clamp assembly is actuated to apply a mold break force to the mold halves 110, 112). The clamping-hydraulic column 124 is de-actuated so that the clamp piston 118 no longer applies the clamping force over to the clamp ram 116. The mold-break hydraulic column 126 is actuated so that the clamp piston 118 and the inter-meshable structure 142 are moved so that the rear-tooth portions 148, 144 of the inter-meshable structures 120, 142 contact one another. The mold-break hydraulic column 126 is further actuated to push the clamp piston 118 against the clamp ram 116 so that the mold halves 110, 112 are urged to break open (that is, the clamp piston 118 has applied the mold break force to the mold halves 110, 112). Once broken open, the actuator 130 cannot yet be actuated to move the movable mold half 112 away from the mold half 110 because the teeth of the inter-meshable structures 120, 142 are intermeshed with each other.

The lower-left corner of FIG. 1E shows the clamp assembly in a clamp un-mesh phase (or clamp-unlock phase). The clamping-hydraulic column 124 is actuated to translate the teeth structures away from each other (this is a teeth clearance phase). Once the teeth are clear from each other (that is, the teeth are offset from each other), the actuator 128 may then be actuated to rotate the clamp piston 118 so that the inter-meshable structures 120, 142 no longer inter-mesh with each other.

The lower-right corner of FIG. 1E shows the clamp assembly (in an un-meshed condition) in a mold-open phase (that is the clamp assembly is de-actuated to apply no forces to the mold halves 110, 112). The actuator 128 was actuated to rotate the clamp piston 118 so that the inter-meshable structures 120, 142 no longer inter-mesh with each other. The actuator 130 is then actuated to translate the column 141 and thus move (stroke) the movable platen 108 so as the mold half 112 becomes separated from the mold half 110.

SUMMARY

By reducing the clamping cycle time of the clamp assembly 100, a reduction in the cycle time of molding systems may be achieved. By reducing the cycle time, capital cost of molding systems may be amortized over a larger quantity of molded articles, which may increase manufacturing profitability. The present invention mitigates the problems associated with known clamp assemblies at least in part.

According to a first aspect of the present invention, there is provided a molding-system clamp assembly of a molding system, the molding system being configured to handle a mold, the molding-system clamp assembly including: (i) a clamp piston being configured to apply a mold-clamping force to the mold that is being held shut by the molding system, and the clamp piston being configured to remove the mold-clamping force from the mold after the mold becomes filled with a molding material and the molding material has cooled down and become solidified, and (ii) a clamp ram being movable relative to the clamp piston, the clamp ram and the clamp piston each including: (a) inter-meshable structures being configured to selectively inter-mesh the clamp piston relative to the clamp ram, the inter-meshable structures being intermeshing with each other so that the clamp piston and the clamp ram intermesh relative to each other, once the inter-meshable structures do not interfere with each other while the mold remains not yet been broken apart, the clamp piston is movable, the inter-meshable structures being configured to be movable to an unmeshed position, in the unmeshed position the clamp piston and the clamp ram do not inter-mesh relative to each other, and (b) inter-abuttable structures being configured to selectively inter-abut the clamp piston relative to the clamp ram, at least one of the inter-abuttable structures having an interposing body, the interposing body being abuttable against the clamp ram, and the interposing body being abuttable against the clamp piston, the inter-abuttable structures being configured to abut with each other so that the clamp piston makes contact with the interposing body, and the inter-abuttable structures being configured to transfer a mold-break force so that the mold-break force is applied from the clamp piston against the interposing body, and in response the mold-break force is transferred from the clamp piston through the interposing body and to the clamp ram, and once mold break has occurred, the clamp piston is deactivated so that the mold may be opened.

According to a second aspect of the present invention, there is provided a molding system being configured to handle a mold, the molding system having a molding-system clamp assembly, including: (i) a clamp piston being configured to apply a mold-clamping force to the mold that is being held shut by the molding system, and the clamp piston being configured to remove the mold-clamping force from the mold after the mold becomes filled with a molding material and the molding material has cooled down and become solidified, and (ii) a clamp ram being movable relative to the clamp piston, the clamp ram and the clamp piston each including: (a) inter-meshable structures being configured to selectively inter-mesh the clamp piston relative to the clamp ram, the inter-meshable structures being intermeshing with each other so that the clamp piston and the clamp ram intermesh relative to each other, once the inter-meshable structures do not interfere with each other while the mold remains not yet been broken apart, the clamp piston is movable, the inter-meshable structures being configured to be movable to an unmeshed position, in the unmeshed position the clamp piston and the clamp ram do not inter-mesh relative to each other, and (b) inter-abuttable structures being configured to selectively inter-abut the clamp piston relative to the clamp ram, at least one of the inter-abuttable structures having an interposing body, the interposing body being abuttable against the clamp ram, and the interposing body being abuttable against the clamp piston, the inter-abuttable structures being configured to abut with each other so that the clamp piston makes contact with the interposing body, and the inter-abuttable structures being configured to transfer a mold-break force so that the mold-break force is applied from the clamp piston against the interposing body, and in response the mold-break force is transferred from the clamp piston through the interposing body and to the clamp ram, and once mold break has occurred, the clamp piston is deactivated so that the mold may be opened.

According to a third aspect of the present invention, there is provided a mold a method of a molding-system clamp assembly of a molding system, the molding system having a mold, the molding-system clamp assembly having a clamp ram and a clamp piston each including inter-abuttable structures and inter-meshable structures, the clamp ram being movable relative to the clamp piston, the inter-meshable structures being configured to selectively inter-mesh the clamp piston relative to the clamp ram, the inter-abuttable structures being configured to selectively inter-abut the clamp piston relative to the clamp ram, at least one of the inter-abuttable structures having an interposing body, the interposing body being abuttable against the clamp ram, and the interposing body being abuttable against the clamp piston, the method including: (i) intermeshing the inter-meshable structures with each other so that the clamp piston and the clamp ram intermesh relative to each other, (ii) actuating the clamp piston to apply a mold-clamping force to the mold that is being held shut by the molding system, (iii) deactivating the clams piston so as to remove the mold-clamping force from the mold after the mold is filled with a molding material and the molding material has cooled down and become solidified, (iv) moving the clamp piston so that the inter-meshable structures do not interfere with each other and the mold remains not yet been broken apart, (vl moving the inter-meshable structures to an unmeshed position, in the unmeshed position the clamp piston and the clamp ram do not inter-mesh relative to each other, (vi) abutting the inter-abuttable structures with each other so that the clamp piston makes contact with the interposing body, and (vii) transferring, via the inter-abuttable structures, a mold-break force so that the mold-break force is applied from the clamp piston against the interposing body, and in response the mold-break force is transferred from the clamp piston through the interposing body and to the clamp ram, and once mold break has occurred, the clamp piston is deactivated so that the mold may be opened.

According to a fourth aspect of the present invention, there is provided a mold of a molding system, the mold, including mold halves configured to cooperate with a molding-system clamp assembly, the molding-system clamp assembly including inter-abuttable structures, and inter-meshable structures, the inter-abuttable structures configured to, in cooperation with the inter-meshable structures, transfer a force to the mold halves.

According to a fifth aspect of the present invention, there is provided a method for arranging a molding-system clamp assembly, the method including configuring inter-abuttable structures, and configuring inter-meshable structures, the inter-abuttable structures configured to, in cooperation with the inter-meshable structures, transfer a force to a mold.

According to a seventh aspect of the present invention, there is provided an article of manufacture for directing a data processing system to control a molding-system clamp assembly operatively connectable to the data processing system, the article of manufacture including a data processing system usable medium embodying one or more instructions executable by the data processing system, the one or more instructions including instructions for directing the data processing system to actuate inter-abuttable structures, and instructions for directing the data processing system to actuate inter-meshable structures, the inter-abuttable structures configured to, in cooperation with the inter-meshable structures, transfer a force to a mold.

According to an eighth aspect of the present invention, there is provided a data processing system for controlling a molding-system clamp assembly operatively connectable to the data processing system, the data processing system including a data processing system usable medium embodying one or more instructions executable by the data processing system, the one or more instructions including instructions for directing the data processing system to actuate inter-abuttable structures, and instructions for directing the data processing system to actuate inter-meshable structures, the inter-abuttable structures configured to, in cooperation with the inter-meshable structures, transfer a force to a mold.

A technical effect of the aspects of the present invention is a reduction in clamping cycle time relative to the known clamp assembly of FIGS. 1A to 1E. Hence, overall cycle time of molding systems using the aspects may be reduced, and the cost of the molding systems may be amortized over a larger number of molded articles manufactured, which may increase profitability for users of the molding systems.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

Figure 1A:
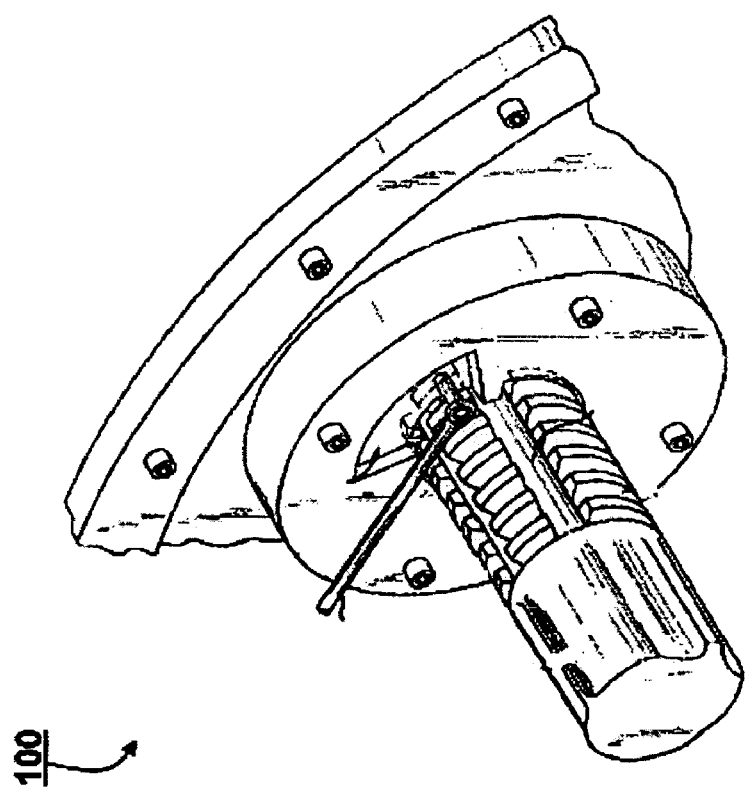
FIGS. 1A to 1E are views of a known molding-system clamp assembly.
Figure 1B:
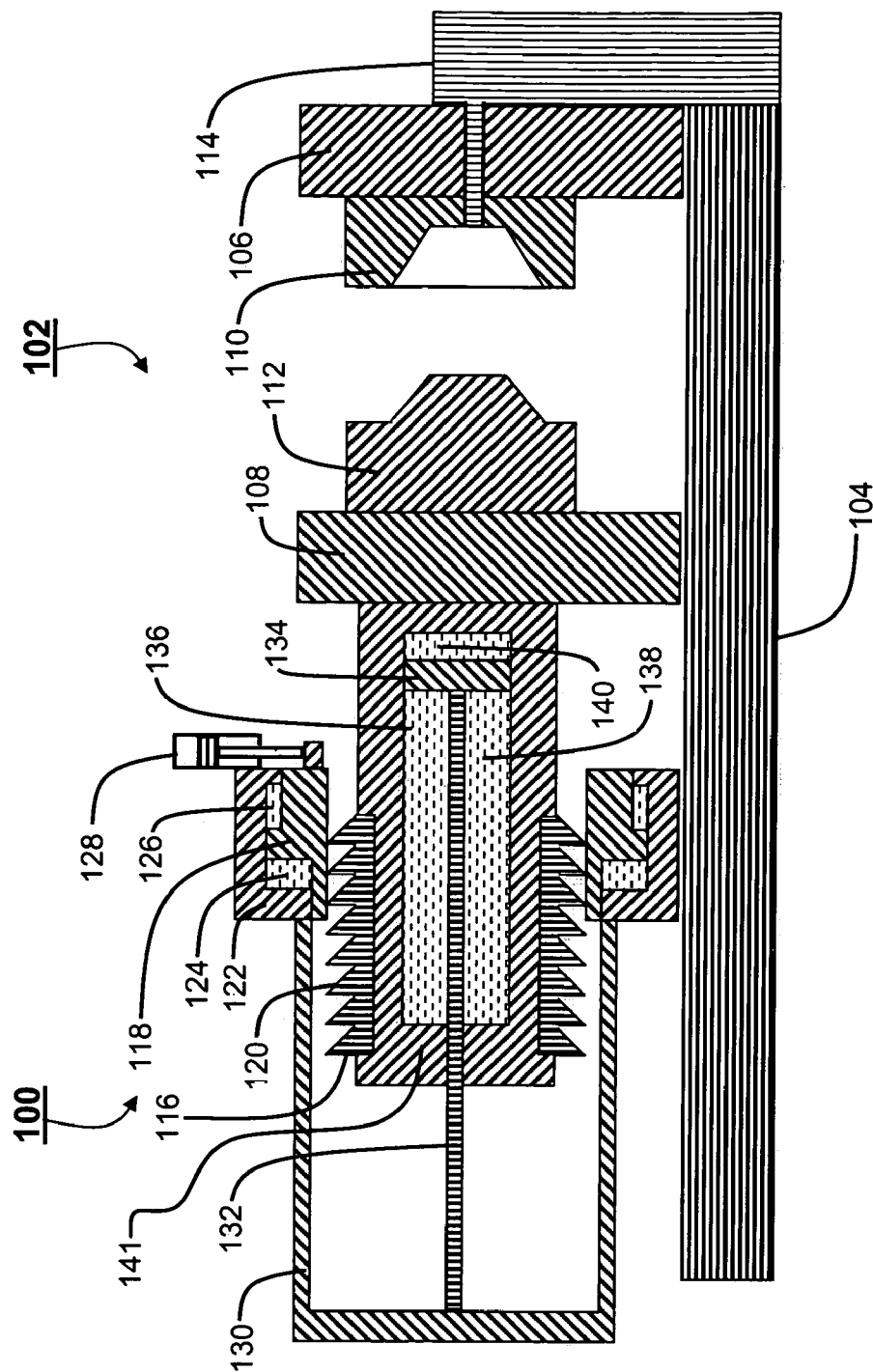
Figure 1C:
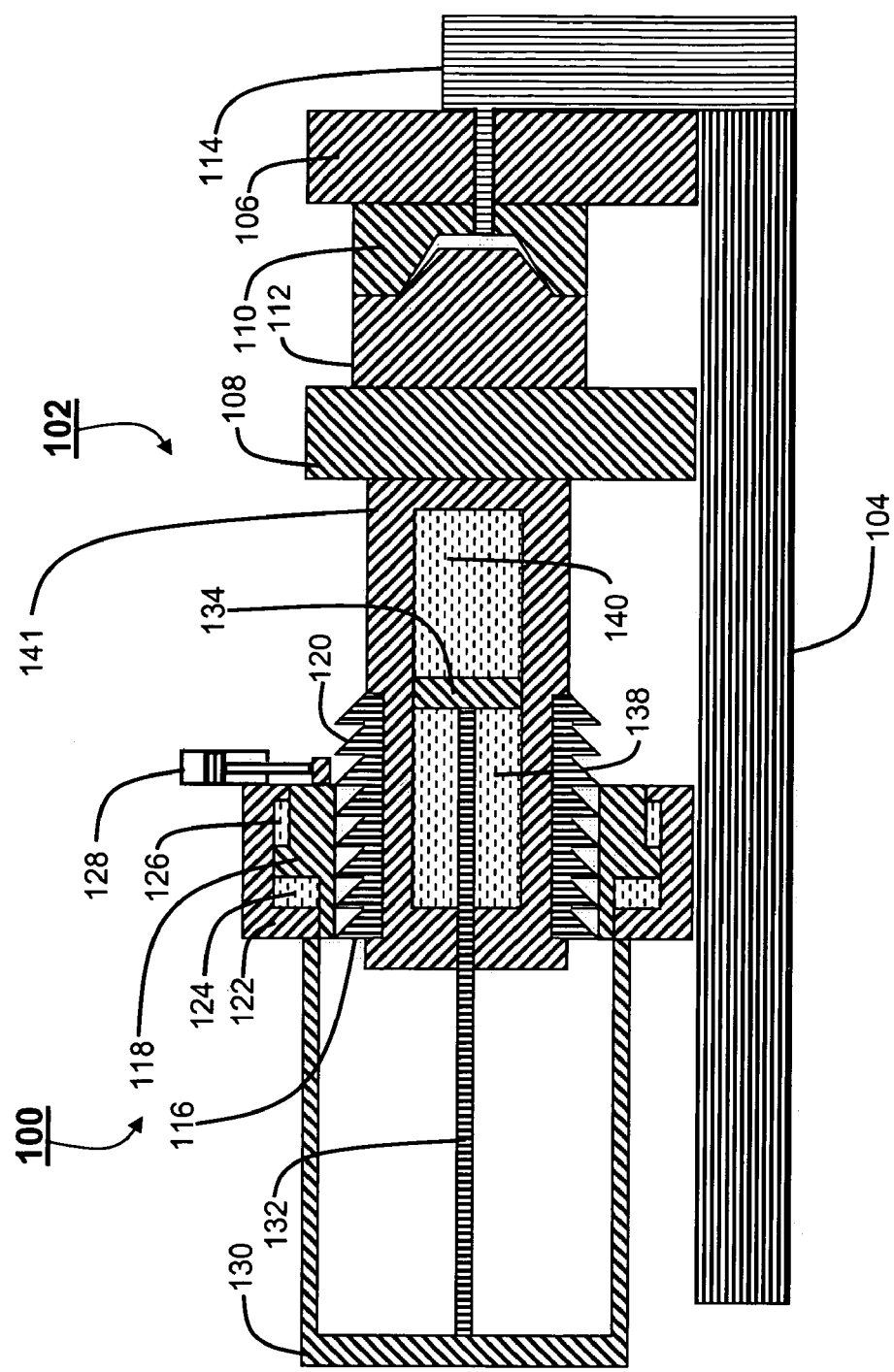
Figure 1D:
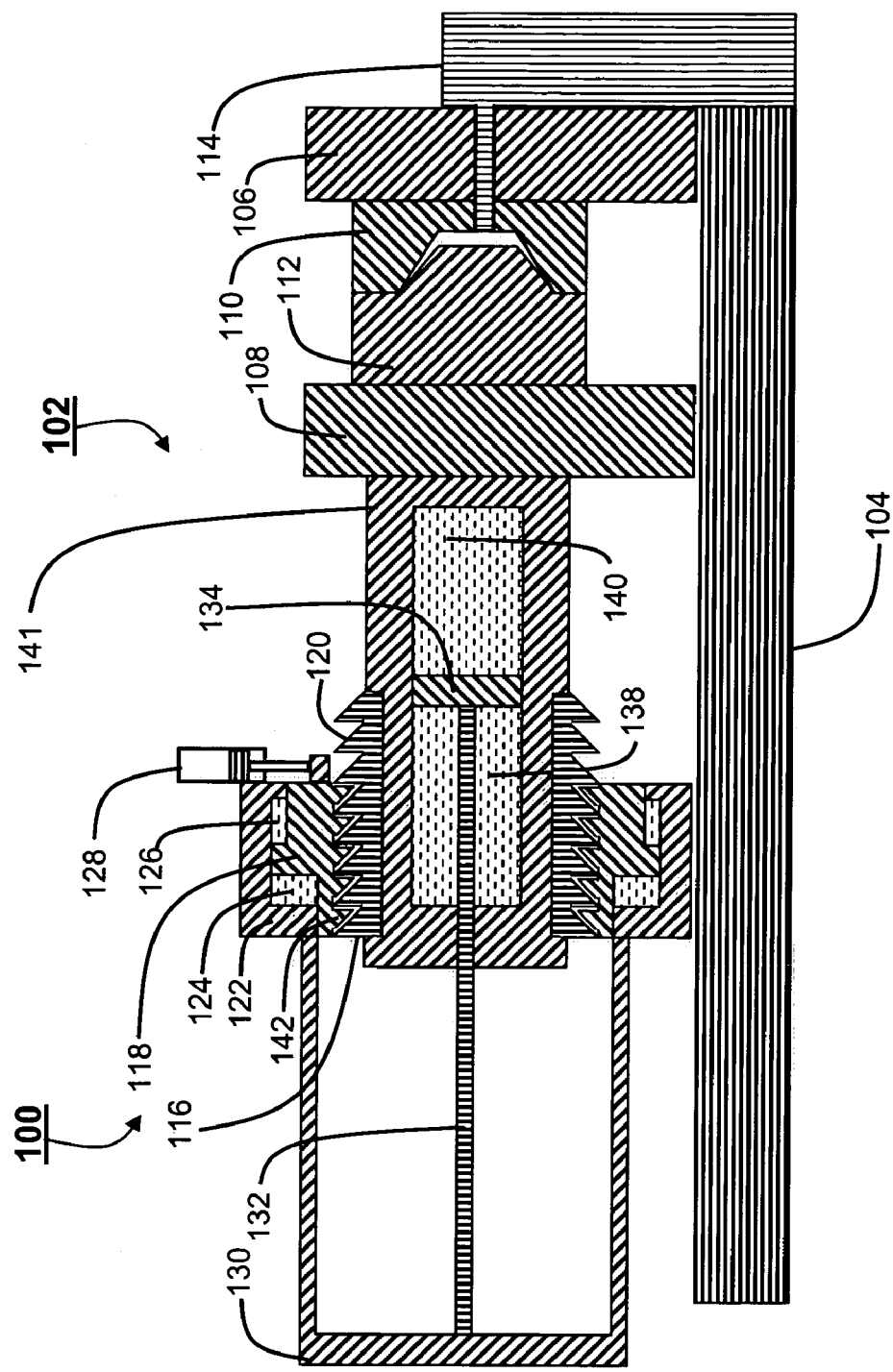

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

REFERENCE NUMERALS USED IN THE DRAWINGS

The following is a listing of the elements designated to each reference numerals used in the drawings.

| | |
|---|---|
| clamp assembly 100 | molding system 102 |
| base 104 | stationary platen 106 |
| movable platen 108 | stationary mold half 110 |
| movable mold half 112 | injection unit 114 |
| clamp ram 116 | clamp piston 118 |
| inter-meshable structure 120 | housing 122 |
| clamping-hydraulic column 124 | mold-break hydraulic column 126 |
| actuator 128 | actuator 130 |
| rod 132 | cylinder head 134 |
| chamber 136 | mold-opened hydraulic column 138 |
| mold-closed hydraulic column 140 | column 141 |
| inter-meshable structure 142 | rear-tooth portion 144 |
| flank-tooth portion 146 | rear-tooth portion 148 |
| flank-tooth portion 150 | |
| clamp assembly 200 | molding system 202 |
| clamp piston 204 | clamp ram 206 |
| inter-meshable structure 208 | inter-meshable structure 210 |
| inter-abuttable structure 212 | inter-abuttable structure 214 |
| interposing body 216 | groove 218 |
| clamp column 220 | housing 222 |

-continued

| | |
|---|---|
| clamping-hydraulic column 224 | mold-break hydraulic column 226 |
| actuator 228 | actuator 229 |
| rear-tooth portion 230 | flank-tooth portion 232 |
| rear-tooth portion 234 | flank-tooth portion 236 |
| clamp assembly 238 | interposing body 240 |
| clamp assembly 242 | interposing body 244 |
| interposing body 245 | groove 246 |
| clamp assembly 248 | interposing body 250 |
| groove 252 | embankment 254 |
| clamp assembly 256 | interposing body 258 |
| clamp assembly 260 | extension 262 |
| interposing body 264 | clamp assembly 266 |
| interposing body 268 | bearing 270 |
| movable platen 272 | stationary platen 274 |
| movable mold half 276 | stationary mold half 278 |
| clamp assembly 302 | clamp assembly 304 |
| molding system 306 | injection unit 308 |
| movable mold half 310 | stationary mold half 312 |
| movable platen 314 | stationary platen 316 |
| platen actuator 318 | tie bar 320 |
| tie bar 322 | passageway 324 |
| passageway 326 | clamp piston 328 |
| clamp ram 330 | inter-meshable structure 332 |
| inter-meshable structure 334 | inter-abuttable structure 336 |
| inter-abuttable structure 338 | interposing body 340 |
| clamp piston 342 | clamp ram 344 |
| inter-meshable structure 346 | inter-meshable structure 348 |
| inter-abuttable structure 350 | inter-abuttable structure 352 |
| interposing body 354 | housing 356 |
| clamping-hydraulic column 358 | mold-break hydraulic column 360 |
| actuator 362 | housing 364 |
| clamping-hydraulic column 368 | mold-break hydraulic column 370 |
| actuator 372 | |
| clamping assembly 402 | clamping assembly 404 |
| molding system 406 | injection unit 408 |
| movable mold half 410 | stationary mold half 412 |
| movable platen 414 | stationary platen 416 |
| platen actuator 418 | tie bar 420 |
| tie bar 422 | passageway 424 |
| passageway 426 | clamp ram 430 |
| inter-meshable structure 432 | inter-meshable structure 434 |
| inter-abuttable structure 436 | inter-abuttable structure 438 |
| interposing body 440 | clamp ram 444 |
| inter-meshable structure 446 | inter-meshable structure 448 |
| inter-abuttable structure 450 | inter-abuttable structure 452 |
| interposing body 454 | clamping-hydraulic column 458 |
| mold-break hydraulic column 460 | actuator 462 |
| clamping-hydraulic column 468 | mold-break hydraulic column 470 |
| actuator 472 | cap 474 |
| cap 476 | |
| clamp assembly 500 | molding system 502 |
| clamp piston 504 | clamp ram 506 |
| inter-meshable structure 508 | inter-meshable structure 510 |
| inter-abuttable structure 512 | inter-abuttable structure 514 |
| interposing body 516 | groove 518 |
| clamp column 520 | housing 522 |
| clamping-hydraulic column 524 | mold-break hydraulic column 526 |
| actuator 528 | actuator 529 |
| movable platen 572 | stationary platen 574 |
| movable mold half 576 | stationary mold half 578 |
| tie bar 580 | tie bar 584 |
| lock nut 584 | lock nut 586 |
| article of manufacture 600 | data processing system 602 |
| data processing system | |
| usable medium 604 | |
| instructions 606 | |

DETAILED DESCRIPTION OF THE EXEMPLARY EMBODIMENTS

The exemplary embodiments are described below along with a description of the reduction in cycle time associated with using some of the exemplary embodiments (in view of the known clamp assembly 100 of FIGS. 1A to 1E).

Figure 1E:
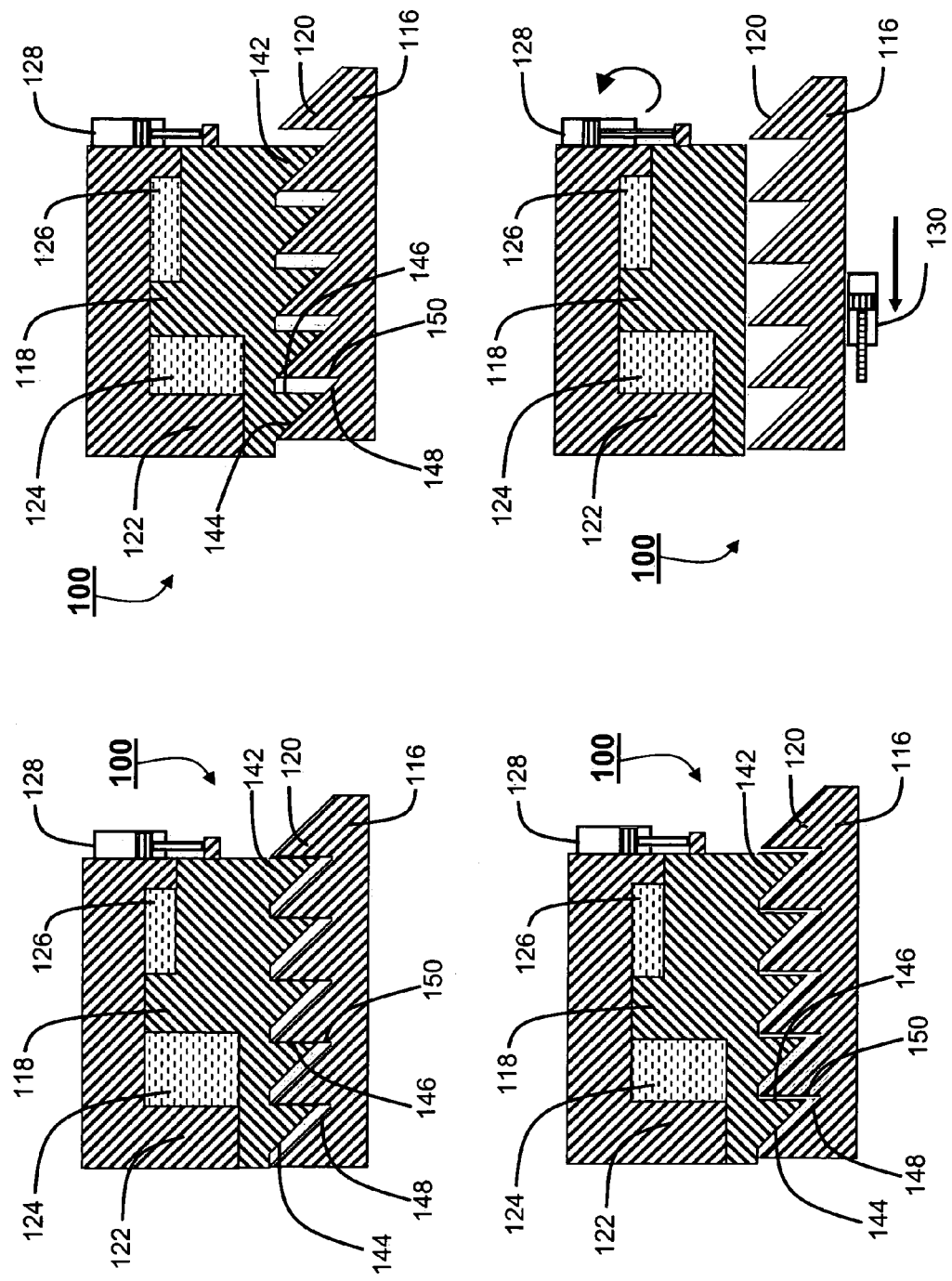
Figure 2A:
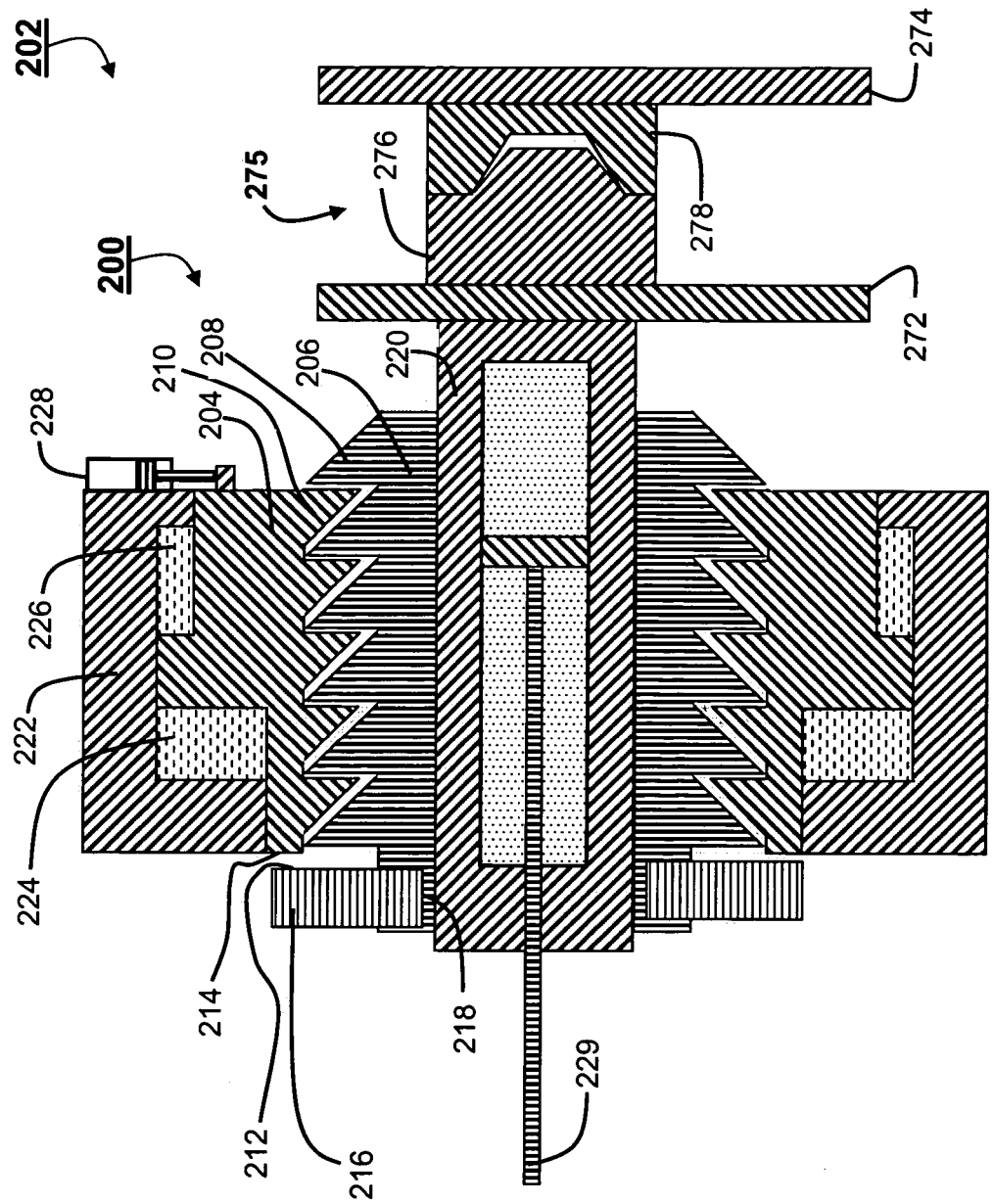
FIGS. 2A to 2S are views of a molding-system clamp assembly according to a first, a second, a third, a fourth, a fifth, a sixth and a seventh exemplary embodiment.

FIG. 2A is a cross-sectional view of a molding-system clamp assembly 200 (hereafter referred to as the "clamp assembly 200" or the "assembly 200") according to the first exemplary embodiment (which is the preferred embodiment). The assembly 200 is used in a molding system 202 of which a limited depiction thereof is provided. Apart from the assembly 200, the molding system 202 is similar to that of the molding system 102 of FIGS. 1A to 1E. Preferably, the clamp assembly 200 includes a clamp piston 204 and a clamp ram 206. The clamp ram 206 and the clamp piston 204 have inter-meshable structures 208, 210 (respectively) that are configured to selectively inter-mesh the clamp piston 204 relative to (or relative with) the clamp ram 206. In addition, the clamp ram 206 and the clamp piston 204 also have inter-abuttable structures 212, 214 (respectively) that are configured to selectively inter-abut the clamp piston 204 relative to (or relative with) the clamp ram 206. The inter-meshable structures 208, 210, in cooperation with the inter-abuttable structures 212, 214, transfer a force to a mold 275. The inter-meshable structures 205, 210 are used to transfer a mold-clamping force over to the mold 275. The inter-abuttable structures 212, 214 are used to transfer a mold-break force over to the mold 275.

The inter-meshable structures 208, 210 are actuatable to mesh and unmesh relative to each other between a meshed-engagement position (which is depicted in FIG. 2A) and an unmeshed position. The unmeshed position is not depicted in FIG. 2A but is depicted in FIGS. 2D and 2E. The inter-abuttable structures 212, 214 permit the clamp ram 206 and the clamp piston 204 to selectively inter-abut relative to (or relative with) each other once the inter-meshable structures 208, 210 that are intermeshing no longer intermesh each other and the clamp piston 204 is actuated to move relative to the clamp ram 206. At least one of the inter-abuttable structures 212 and/or 214) is offset from any one of the inter-meshable structures (208 and/or 210). Preferably, the inter-meshable structures 208, 210 and the inter-abuttable structures 212, 214 do not share common structures.

According to the first exemplary embodiment, each of the inter-meshable structures 208, 210 include a plurality of inter-meshable teeth in which at least one axially-aligned groove (not depicted) is interposed between rows of teeth. The (at least one axially-aligned) groove permits the clamp piston 204 and the clamp ram 206 to be intermeshed or not intermeshed (that is, to be selectively inter-meshable relative to each other). The groove permits the set of teeth (of the clamp piston 204 and the clamp ram 206) to disengage from each other so that the clamp column 220 may be actuated to move a platen connected to the clamp column 220. The clamp-piston teeth extend from the clamp piston 204, the clamp-ram teeth extend from the clamp ram 206, and the clamp-ram teeth inter-mesh with the clamp-piston teeth (between an un-meshed position and a meshed position).

According to an alternative, the inter-meshable structures 208, 210 are similar to the pineapple structure of the known clamp assembly 100. According to another alternative (not depicted), other geometric forms implement the inter-meshable structures 208, 210. The shape of the inter-meshable structures 208, 210 is not important provided that the inter-meshable structures 208, 210 can be inter-mesh and unmeshed relative to each other. According to yet another alternative, the inter-meshable structures 208, 210 each include one tooth that inter-mesh relative to each other.

According to the first embodiment, the inter-abuttable structure 212 is (preferably) a surface of an interposing body 216 and that the interposing body 216 is fixedly attached to the clamp ram 206, and the inter-abutable structure 214 is (preferably) a surface of the clamp piston 204 that is abuttable against the surface of interposing body 216. The interposing body 216 fits in a groove 218 defined by the clamp ram 206. The shape of the inter-abuttable structures 212, 214 is not important, but what is important is that the inter-abuttable structures 212, 214 permit the clamp piston 204 and the clamp ram 206 to inter-abut relative to each other. In an alternative, the interposing body 216 is integral with the clamp ram 206.

In operation, the inter-meshable structures 208, 210 are actuated to move to the unmeshed position, in which the clamp piston 204 and the clamp ram 206 do not inter-mesh relative to each other (that is, the teeth of the inter-meshing structures are do not touch each other and the teeth no longer face each other). By actuating the mold-break hydraulic column 226 (by pumping hydraulic fluid into the mold-break hydraulic column 226), the clamp piston 204 is actuated to contact the interposing body 216 and then to apply a mold break force against the interposing body 216. In response the interposing body 216 transfers the mold break force from the clamp piston 204 over to the clamp ram 206. Once mold break has occurred (that is, mold halves 276, 278 have been broken open or apart from one another), the mold-break hydraulic column 226 is relieved (that is, the mold-break hydraulic column 226 does not apply any pressure the clamp piston 204), and the clamp column 220 is then actuated (by an actuator 229) to move a movable platen 272 (hereafter referred to as the "movable platen 272") which then in turn moves a movable mold half 276 away from a stationary mold half 278. The mold halves 276, 278 are included in the mold 275.

Note that according to the first exemplary embodiment, the teeth of the inter-meshable structure 208, 210 that are intermeshing are unmeshed form each other, then the mold break force may be applied to the mold 275 and then stroking of the platen 272 may be performed. In sharp contrast, according to the known clamp assembly 100 of FIG. 1A cycle time is lost because the mold break force is applied to the mold 110, 112 and then extra time is taken (that is, time is lost) to place the teeth of the inter-meshable structures 120, 142 that are intermeshing with each other in clearance position then unmesh from each other, and then the movable platen 108 may be stroked.

Generally, the inter-meshable structures 208, 210, in cooperation with inter-abuttable structures 212, 214, transfer a force to the mold 275. Preferably, the inter-meshable structures 208, 210 transfer a mold-clamping force over to the mold 275, and the inter-abuttable structures 212, 214 transfer a mold-break force over to the mold 275.

According to the first exemplary embodiment, the clamp piston 204 is housed in a housing 222 (which is sometimes referred to as a clamp block). The clamp piston 204 moves relative to the housing 222. Defined between the housing 222 and the clamp piston 204 is a clamp-hydraulic column 224 and a mold-break hydraulic column 226. When actuated, the clamp-hydraulic column 224 fills with hydraulic fluid so as to pushes the clamp piston 204 which in turn pushes the clamp column 220 toward the platen 272 that is attached to the movable mold half 276 (that is, the clamp piston 204 moves to apply a clamp force toward the mold 275. The stationary mold half 278 is attached to the stationary platen 274. After the clamping-hydraulic column 224 is relieved, the mold-break hydraulic column 226 is actuated to push the clamp piston 204 away form the mold 275 (that is, the clamp piston 204 applies a mold break force which breaks open the movable mold half 276 relative to, or away from, the stationary mold half 278). By selecting specific teeth of the clamp piston 204 to engage with specific teeth of the clamp ram 206, mold-height adjustment may be performed to accommodate molds of different heights or sizes.

An actuator 228 is mounted to the housing 222. The actuator 228 actuatably rotates the clamp piston 204 so that the inter-meshable structures 208, 210 become movable between the meshed-engagement position and the unmeshed position. An actuator 229 actuatably translates a clamp column 220 (and the clamp ram 206) toward and away from the mold (to open and to close the mold). In operation, the actuator 228 is actuated to rotate the inter-meshable structures 208, 210 into the meshed-engagement position as depicted in FIG. 2A. The teeth of the clamp piston 204 and the teeth of the clamp ram 206 do not touch or interfere with each other during this phase of the clamping cycle of the clamp assembly 200 (but they may touch if so desired).

FIG. 2B is a cross section view of the clamp assembly 200 of FIG. 2A in which the clamp piston 204 is actuated to apply the clamping force to the mold halves 276, 278. The clamp piston 204 and the clamp ram 206 are shown intermeshed relative to each other. The inter-meshable structure 210 includes a rear-tooth portion 230 and a flank-tooth portion 232 that are, preferably, surfaces of teeth. In effect, piston teeth extend from the clamp piston 204, and ram teeth extend from the clamp ram 206. The inter-meshable structure 208 includes a rear-tooth portion 234 and a flank-tooth portion 236 that are each tooth surfaces (that is, surfaces of teeth). The clamping-hydraulic column 224 is actuated to move the clamp piston 204 toward the mold halves 276, 278, which causes the flank-tooth portion 232 to abut the flank-tooth portion 236. In turn, this action transfers the clamping force to the clamp ram 206, which in turn transfers the clamp force to the mold halves 276, 278 to (in effect) clamp the mold 275 shut.

FIG. 2C is a cross-sectional view of the clamp assembly 200 of FIG. 2A in which the clamp piston 204 is actuated to remove (or de-actuate) the clamp force from the mold halves 276, 278. The clamping-hydraulic column 224 is de-pressurized, the mold-break hydraulic column 226 is energized (or pressurized), and then the clamp piston 204 moves away from the mold halves 276, 275. Movement of the clamp piston 204 (hereafter referred to as the "piston 204") causes the flank-tooth portion 232 to translate away from the flank-tooth portion 236. The inter-meshable structure 208 does not interfere or touch the inter-meshable structure 210. The mold halves 276, 278 have not yet been broken apart from each other at this point the clamp cycle.

FIG. 2D is a cross-sectional view of the clamp assembly 200 of FIG. 2A in which the inter-meshable structures 208, 210 become unmeshed from each other so that in effect the clamp piston 204 becomes un-meshed from the clamp ram 206. The actuator 228 is actuated to rotate the clamp piston 204, which in turn rotates the inter-meshable structure 210 away from the inter-meshable structure 208 from the meshed-engagement position to the unmeshed position. The mold halves 276, 278 have not yet been broken open (that is, pulled apart from one another).

FIG. 2E is a cross-sectional view of the clamp assembly 200 of FIG. 2A in which the mold-break hydraulic column 226 is actuated to push and abut the clamp piston 204 against the interposing body 218 with sufficient force (that is, the mold break force) to push the clamp ram 206 away from the mold 275 so that the platen 272 is forced to move and then break open the mold halves 278, 278 (in this sense, the mold break force is applied to the mold 275). Once the mold halves 276, 278 have been broken open, an actuator 229 is actuated to push the clamp column 220 away to open the mold halves 276, 278 so that a molded article may be retrieved from a mold cavity defined by the mold halves 276, 278. In effect, the clamp ram 206 breaks the movable mold half 276 away from the stationary mold half 278 responsive to the clamp piston 204 unmeshing from the clamp ram 206, the piston 204 abutting against the interposing body 216, and then the piston 204 pushing the interposing body 216 (which is attached to the clamp ram 206) and thereby the clamp ram 206 receives the mold-break force from the clamp piston 204 (according to the depicted embodiment) and then the mold break force is transferred over to the mold 275.

FIG. 2F is a side view and a frontal view of the interposing body 216 of FIG. 2A. On the left side is the side view of the interposing body 216. On the right side is the frontal view of the interposing body 216. The interposing body 216 is preferably made in two halves so that it can be securably assembled to the groove in the clamp ram 206. The two halves of the interposing body 216 are lockably engagable relative to each other so the locked and engaging halves don't fall off the groove in the clamp ram 206 when the molding system 202 operates. For example, a pin (or pins) extends from clamp ram 206 and into the interposing body 216 to engage the clamp ram 206 to the interposing body 216.

FIG. 2G is a cross-sectional view of a molding-system clamp assembly 238 (hereafter referred to as the "camp assembly" 238) according to the second exemplary embodiment, the clamp assembly 238 includes an interposing body 240 that interacts With or abuts against the inter-meshable structure 208. The interposing body 240 is lockably repositionable relative to the clamp ram 206 and/or the inter-meshable structure 208. The interposing body 240 is shaped to form a ring. The interposing body 240 is preferably made in two halves so that it can be securably assembled to the groove in the clamp ram 206. The two halves of the interposing body 240 are lockably engagable relative to each other so the locked and engaging halves don't fall off the groove in the clamp ram 206 when the molding machine operates.

FIG. 2H is a side view and a frontal view of the interposing body 240 of FIG. 2G. On the left side is a side view of the interposing body 240. On the right side is a frontal view of the interposing body 240.

FIG. 2I is a cross-sectional view of a molding-system clamp assembly 242 (hereafter referred to as the "clamp assembly" 242) according to the third exemplary embodiment. The clamp assembly 242 includes an interposing body 244 and an interposing body 245 that abuts the interposing body 244. The interposing body 244 provides the inter-abutable structure 212. The interposing body 245 helps to improve the transfer of force from the clamp piston 204 to the clamp ram 206. The clamp ram 206 defines a groove 246 for receiving the interposing bodies 244 and 245.

FIG. 2J is a side view of the interposing body 244 and the interposing body 245 of FIG. 2I. The interposing body 244 and the interposing body 245 each form a ring-like structure that is removable from the clamp ram 206. The interposing bodies 244 and 245 are preferably each made in two halves so that they can be securably assembled to the groove in the clamp ram 206. The two halves of the interposing body 244 are lockably engagable relative to each other so the locked and engaging halves don't fall off the groove in the clamp ram 206 when the molding machine operates. The two halves of the interposing body 245 are lockably engagable relative to each other so the locked and engaging halves don't fall off the groove in the clamp ram 206 when the molding machine operates.

FIG. 2K is a cross-sectional view of a molding-system clamp assembly 248 (hereafter referred to as the "clamp assembly" 248) according to the fourth exemplary embodiment. The clamp assembly 248 includes an interposing body 250 that is removable and fits within a groove 252 defined by the clamp ram 206. An embankment 254 extends from the clamp ram 206 to contact and abut against the interposing body 250. The embankment 254 is an integral extension of the clamp ram 206.

FIG. 2L is a side view of the interposing body 250 of FIG. 2K. The interposing body 250 is a square-like structure that is detachable from the clamp ram 206. The interposing body 250 preferably includes three portions so that it can be securably assembled to the groove in the clamp ram 206. The three portions of the interposing body 250 are lockably engagable relative to each other so the locked and engaging portions don't fall off the groove in the clamp ram 206 when the molding machine operates.

Figure 2M:
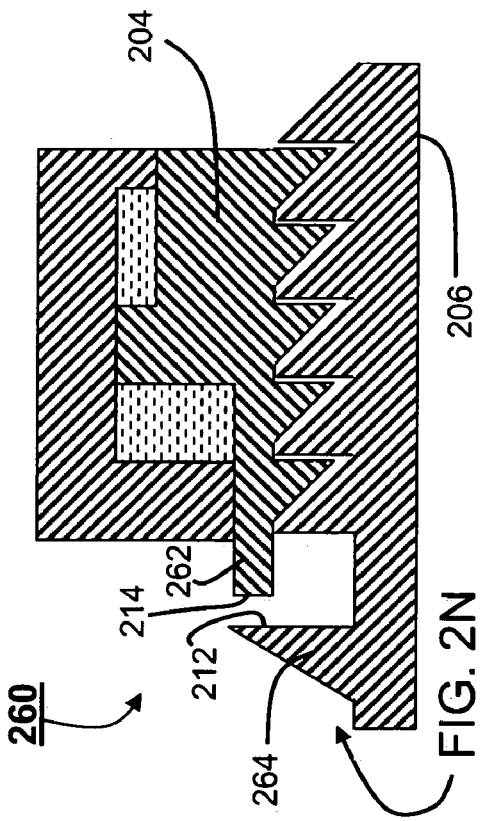

FIG. 2M is a cross-sectional view of a molding-system clamp assembly 256 (hereafter referred to as the "clamp assembly" 256) according to the fifth exemplary embodiment. The clamp assembly 256 includes an interposing body 258 that extends from the clamp ram 206 and is integral to the clamp ram 206. The interposing body 258 is not removable from the clamp ram 206. The inter-abuttable structure 212 includes a ram surface (which is formed part of the interposing body 258) defined by the clamp ram 206. The inter-abuttable structure 214 includes a piston surface defined by the clamp piston 204. The ram surface is abuttable to the piston surface.

Figure 2N:
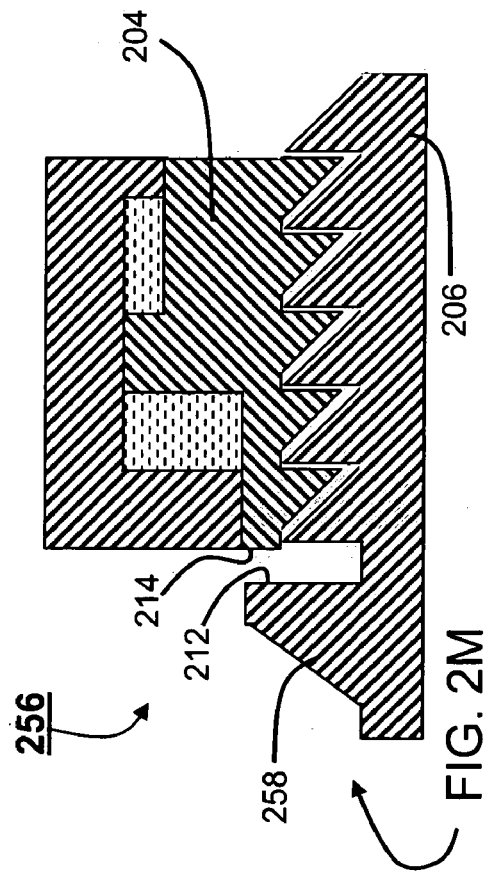

FIG. 2N is a cross-sectional view of a molding-system clamp assembly 260 (hereafter referred to as the "clamp assembly" 260) according to the sixth exemplary embodiment. The inter-abuttable structure 214 includes an extension 262 that extends from the clamp piston 204 and is integral to the clamp piston 204. The inter-abutable structure 212 includes an interposing body 264 that extends from the clamp ram 206 and is integral to the clamp ram 206. The interposing body 264 presents a body surface that abuts a surface of the extension 262.

Figure 2O:
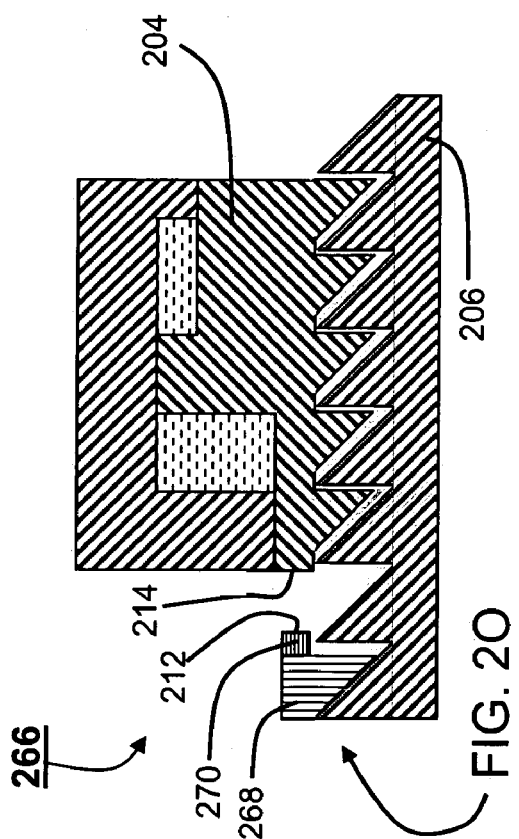

FIG. 2O is a cross-sectional view of a molding-system clamp assembly 266 (hereafter referred to as the "clamp assembly" 266) according to the seventh exemplary embodiment. The inter-abuttable structure 214 is a surface of the clamp ram 206. The inter-abuttable structure 214 includes a bearing 270 of an interposing body 268 that interacts with a surface of the clamp ram 206. The bearing 270 extends from the interposing body 268. The bearing 270 reduces mechanical wear of the interposing body 268.

When the operations of rotating the inter-meshable structures 208, 210 and breaking open the mold 275 are performed one after the other in a serial fashion (that is, these movements are not performed simultaneously), the clamping cycle time of the clamp assembly 200 was measured to be 3.7% lower than the cycle time of the known clamp assembly of FIGS. 1A to 1E.

When the operations of the inter-meshable structures 208, 210 and breaking open the mold 275 are performed simultaneously (or near simultaneously) or in an overlapped manner, the clamping cycle time of the clamp assembly 200 was measured to be 16.3% lower than the cycle time of the known clamp assembly of FIGS. 1A to 1E.

The reduction in cycle time may be attributed to the fact that the actions associated with FIG. 1E (the upper-right corner and the lower-left corner) is avoided, in which the clamp piston 118 abuts against and is then pushed against the clamp ram 116 (to apply the mold break force), and then the teeth of the inter-meshable structures 120, 142 that are inter-meshing with each other are positioned so as to not interfere with each other before the clamp piston 118 may be de-meshed from the clamp ram 116. The exemplary embodiments avoid using the sequencing of the actions of the known clamp assembly 100 so that a reduced cycle time may be achieved.

FIGS. 2P to 2S are cross-sectional views of clamp assembly 200 that may be optionally used during a clamp-up phase (or a clamp-up sequence) in which the mold 275 is clamped up.

FIG. 2P shows the actuator 229 actuated to move the clamp column 220 toward the mold halves 276, 278 so that the interposing body 216 will be moved toward the clamp piston 204 and so that the mold halves 276, 278 are stroked to close against each other.

FIG. 2Q shows the actuator 229 moving the clamp column 220 which moves the interposing body 216 onto an abutting relationship with the clamp piston 204, and the mold halves 276, 278 are closed against each other.

FIG. 2R shows the inter-meshable structures 208, 210 intermeshing with each other (so that the piston 204 and the clamp ram 206 become in effect intermeshed) and that there is clearance between the teeth of the inter-meshable structures 208, 210.

FIG. 2S shows the clamping-hydraulic column 224 energized so that the clamping force is generated and applied to the mold halves 276, 278, and that the clamp piston 204 and the clamp ram 206 no longer inter-abut one another. In an alternative embodiment, the sequence described for FIG. 2Q and the sequence described for FIG. 2R may be performed simultaneously at least in part.

When the operations of rotating the inter-meshable structures 208, 210 and clamping up the mold 275 are performed one after the other in a serial manner (that is, these movements are not performed simultaneously or in an overlapping manner), the clamping cycle time is 1.5% lower than the cycle time of the known clamp assembly of FIGS. 1A to 1E.

When the operations of rotating the inter-meshable structures 208, 210 and clamping up the mold 275 are performed simultaneously or in an overlapping manner, the clamping cycle time is 4% lower than the cycle time of the known clamp assembly of FIGS. 1A to 1E.

When the operations of the inter-meshable structures 208, 210 and breaking open the mold 275 are performed near simultaneously and then when the operations of rotating the inter-meshable structures 208, 210 and clamping up the mold 275 are performed near simultaneously, the best-case clamping cycle time was measured to be 20% lower than the clamping cycle time of the known clamp assembly 100 of FIGS. 1A to 1E. It will be appreciated that a 20% reduction in clamping cycle time represents a major break through in molding system clamp assemblies.

Figure 3A:
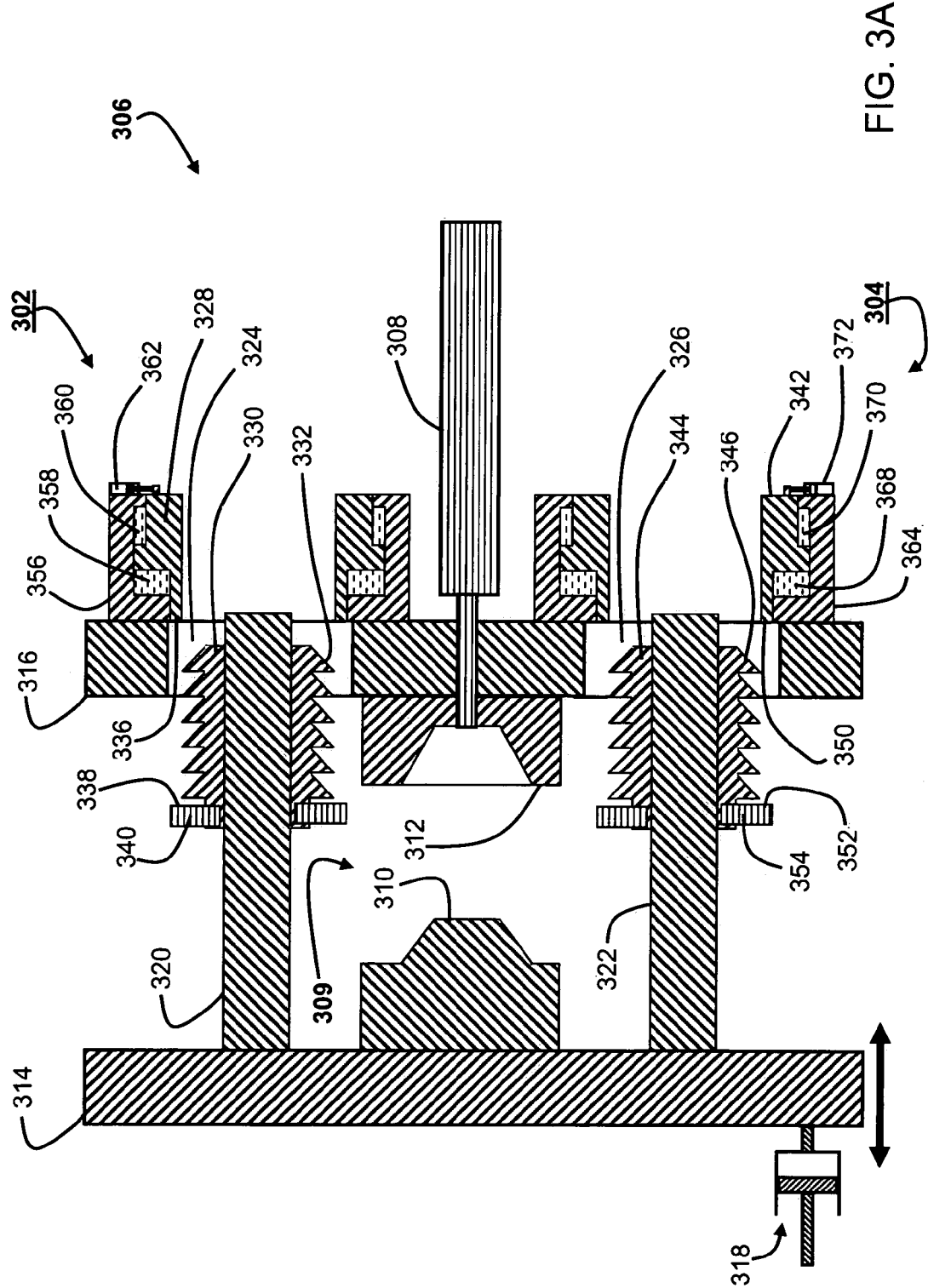
FIGS. 3A to 3B are views of a molding-system clamp assembly according to an eighth exemplary embodiment.
Figure 3B:
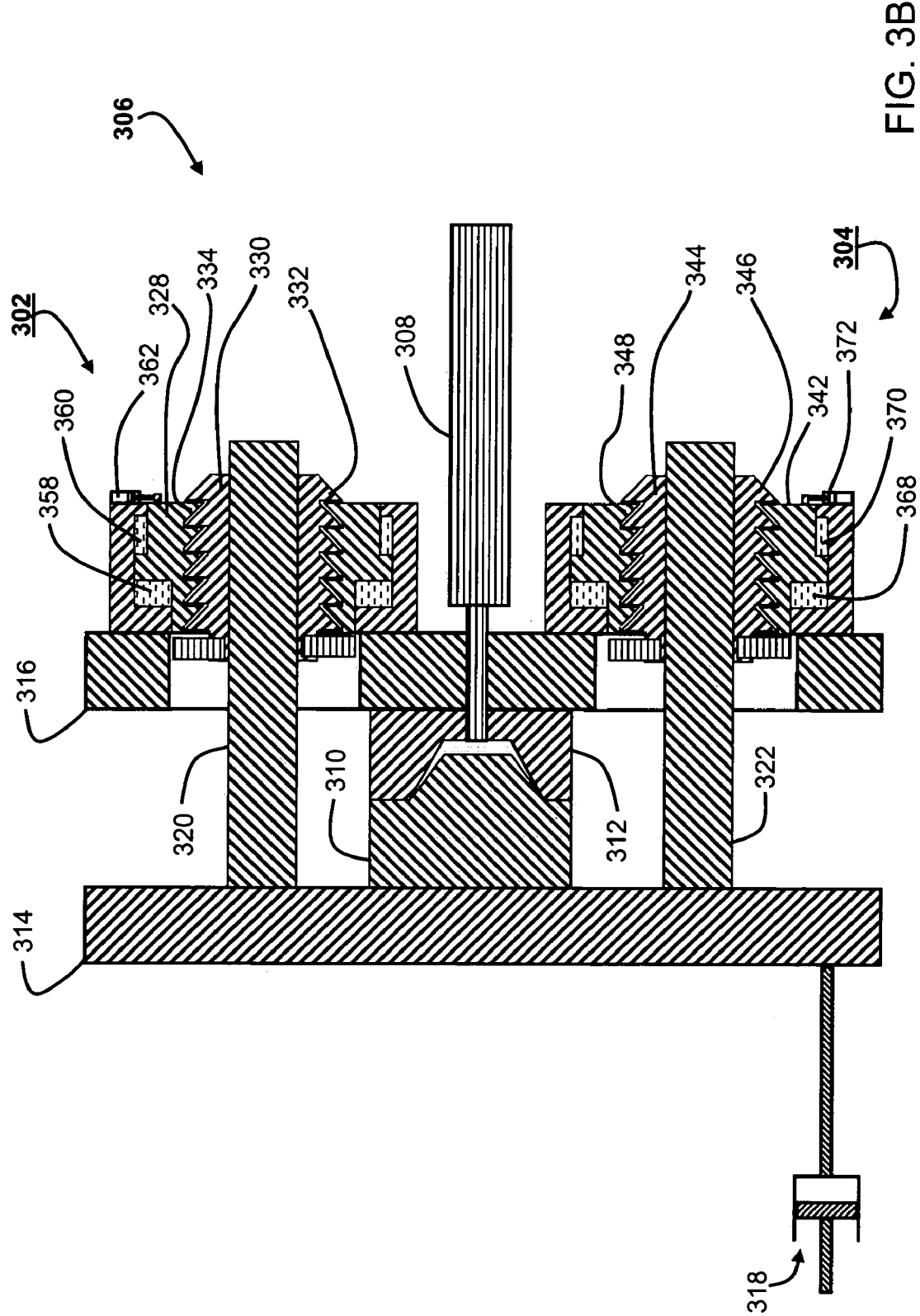

FIGS. 3A and 3B are top views of molding-system clamp assemblies 302, 304 (hereafter referred to as the "clamp assemblies" 302, 304) according to the eighth exemplary embodiment.

FIG. 3A is a cross-sectional view of the clamp assemblies 302, 304 used in a molding system 306. The clamp assemblies 302, 304 are similar to each other. The clamp assemblies 302, 304 are depicted in a non-clamping position, and the molding system 306 is depicted in a mold-opened position. The molding system 306 includes an injection unit 308 that injects, in use, a molding material into a mold cavity that is defined (or created) by a mold 309. The mold 309 includes a movable mold half 310 and stationary mold half 312 (that is, the mold cavity is defined once the mold halves 310, 312 are moved together (as depicted in FIG. 3B), but they are depicted offset from each other in FIG. 3A). The movable mold half 310 is connected to a movable platen 314. The stationary mold half 312 is connected to a stationary platen 316. The stationary platen 316 is fixedly attached to a frame (not depicted) of the molding system 306. A platen actuator 318 is connected to the movable platen 314, and is actuated to move the movable platen 314 toward and away from the stationary platen 316. Tie bars 320, 322 are attached to the movable platen 314 and extend toward and engage with the stationary platen 316. Usually, four tie bars are used. Two tie bars are hidden behind the tie bars 320, 322 and the hidden tie bars are similar to the tie bars 320, 322. The stationary platen 316 defines passageways 324, 326 that are configured to receive (and accommodate) the tie bars 320, 322 respectively.

The clamp assembly 302 includes a clamp piston 328 and a clamp ram 330. The clamp ram 330 and the clamp piston 328 have inter-meshable structures 332, 334 which are configured to selectively inter-mesh the clamp piston 328 relative to the clamp ram 330. FIG. 3A depicts the inter-meshable structure 332, and FIG. 3B depicts the inter-meshable structure 334. The inter-meshable structure 334 is not depicted in FIG. 3A (the reason for this will be explained below). The clamp ram 330 and the clamp piston 328 have inter-abuttable structures 336, 338 that are configured to selectively inter-abut the clamp piston 328 relative to the clamp ram 330. Preferably, the inter-abuttable structure 336 is a surface of the clamp piston 328, and the inter-abuttable structure 338 is a surface of an interposing body 340.

According to an alternative embodiment, the interposing body 340 is not used and the inter-abuttable structure 338 is a surface of the clamp ram 330 and/or the tie bar 320 (these alternatives are not depicted in FIGS. 3A or 3B).

The interposing body 340 is connected to the clamp ram 330 and/or the tie bar 320 (but preferably it is connected to the clamp ram 330). The clamp ram 330 is connected to (or is integral to) a distal end of the tie bar 320. The passageway 324 is configured to receive and to permit passage of the clamp ram 330, and this arrangement permits the clamp ram 330 to interact with the clamp piston 328. According to the eight embodiment, each tie bar has a clamp ram connected at its distal end. Generally the inter-meshable structures 332, 334, in cooperation with inter-abuttable structures 336, 338, transfer a force to the mold 309. Preferably, the inter-meshable structures 332, 334 transfer a mold-clamping force over to the mold 309, and the inter-abuttable structures 336, 338 to transfer a mold-break force over to the mold 309.

The clamp assembly 302 includes a housing 356 that houses the clamp piston 328. Defined between the housing 356 and the clamp piston 328 is a clamping-hydraulic column 358 and a mold-break hydraulic column 360. An actuator 362 is connected between the housing 356 and the clamp piston 328. The actuator 362 actuates (preferably, rotates) the clamp piston 328 so that the inter-meshable structure 334 (that extends from the clamp piston 328) may be rotated away from the inter-meshable structure 332. FIG. 3A depicts the inter-meshable structure 334 rotated away (and thus it is not depicted in FIG. 3A) and this arrangement permits the clamp ram 330 to pass through the passageway 324 and into position for inter-meshable engagement with the clamp piston 328.

The clamp assembly 304 is similar to the clamp assembly 302. The clamp assembly 304 includes a clamp piston 342, and a clamp ram 344. The clamp ram 344 and the clamp piston 342 include inter-meshable structures 346, 348 which are configured to selectively inter-mesh the clamp piston 342 relative to the clamp ram 344. FIG. 3A depicts the inter-meshable structure 346, and FIG. 3B depicts the inter-meshable structure 348. The inter-meshable structure 348 is not depicted in FIG. 3A (the reason for this will be explained below). The clamp ram 344 and the clamp piston 342 have inter-abuttable structures 350, 352 configured to selectively inter-abut the clamp piston 342 relative to the clamp ram 344. Preferably, the inter-abuttable structure 350 is a surface of the clamp piston 342, and the inter-abuttable structure 352 is a surface of an interposing body 354.

According to an alternative embodiment, the interposing body 354 is not used and the inter-abuttable structure 352 is a surface of the clamp ram 344 and/or the tie bar 322 (these alternatives are not depicted in FIGS. 3A and 3B).

The interposing body 354 is connected to the clamp ram 344 and/or the tie bar 322 (but preferably it is connected to the clamp ram 344). The clamp ram 344 is connected to (or is integral to) a distal end of the tie bar 322. The passageway 324 is configured to receive and to permit passage of the clamp ram 344, and this arrangement permits the clamp ram 344 to interact with the clamp piston 342.

The clamp assembly 304 includes a housing 364 that houses the clamp piston 342. Defined between the housing 364 and the clamp piston 342 is a clamping-hydraulic column 368 and a mold-break hydraulic column 370. An actuator 372 is connected between the housing 364 and the clamp piston 342. The actuator 372 actuates (preferably, rotates) the clamp piston 342 so that the inter-meshable structure 348 that extends from the clamp piston 342 may be rotated away from the inter-meshable structure 346. FIG. 3A depicts the inter-meshable structure 348 rotated away (and thus it is not depicted in FIG. 3A) and this arrangement permits the clamp ram 344 to pass through the passageway 326 and into position for inter-meshable engagement with the clamp piston 342. A set of teeth (one for the clamp piston 342 and another set for the clamp ram 344) disengage (that is, not intermeshed) from each other so that the tie bars are free to move (translate) axially. Clamp-piston teeth extend from the clamp piston 342, the clamp-ram teeth extend from the clamp ram 344, and the clamp-ram teeth inter-mesh with the clamp-piston teeth (between an un-meshed position and a meshed position).

FIG. 3B is a cross-sectional view of the clamp assemblies 302, 304 depicted in a clamp position. The molding system 306 is depicted in a mold-closed position. The platen actuator 318 is actuated to stroke or move the movable platen 314 toward the stationary platen 316 until the movable mold half 310 is closed against the stationary mold half 312. The actuator 362 is actuated to move the inter-meshable structure 334 into inter-meshed engagement with the inter-meshable structure 332. The actuator 372 is actuated to move the inter-meshable structure 348 into inter-meshed engagement with the inter-meshable structure 346. The clamp assemblies 302, 304 operate in a similar manner to that of the clamp assemblies according to the exemplary embodiments described above.

When the clamping-hydraulic column 358 is pressurized and the mold-break hydraulic column 360 is depressurized, the clamp piston 328 becomes actuated to apply a clamp force (via the clamp ram 330) to the tie bar 320 which in turn applies the clamp force to the movable platen 314 (hereafter referred to as the "platen 314") and then onto the mold halves 310, 312. The clamping force clamps the mold halves 310, 312 to remain clamped together while the molding material is injected under pressure by the injection unit 308 into the mold cavity (the mold cavity is defined by the mold halves 310, 312). When the clamping-hydraulic column 358 is depressurized and the mold-break hydraulic column 360 is pressurized, a mold-break force is applied by the clamp piston 328, and the clamp piston 328 becomes actuated to apply the mold-break force to the tie bar 320 which in turn applies (or transmits) the mold-break force to the platen 314 and then onto the mold halves 310, 312. The mold-break force breaks the mold halves 310, 312 apart from each other, then the platen actuator 318 is actuated to move (or stroke) the movable platen 314 away from the stationary platen 316, and then the molded article may be removed from the mold cavity.

When the clamping-hydraulic column 368 is pressurized and the mold-break hydraulic column 370 is depressurized, the clamp piston 342 becomes actuated to apply a clamping force (via the clamp ram 344) to the tie bar 322 which in turn applies the clamping force to the platen 314 and then onto the mold halves 310, 312. The clamping force clamps the mold halves 310, 312 to remain clamped together while the molding material is injected under pressure by the injection unit 308 into the mold cavity. When the clamping-hydraulic column 368 is depressurized and the mold-break hydraulic column 370 is pressurized, a mold-break force is applied by the clamp piston 342. The clamp piston 342 becomes actuated to apply the mold-break force to the tie bar 322 which in turn applies (or transmits) the mold-break force to the platen 314 and then onto the mold halves 310, 312. The mold-break force breaks the mold halves 310, 312 apart from each other so that the molded article may be removed from the mold cavity.

Figure 4A:
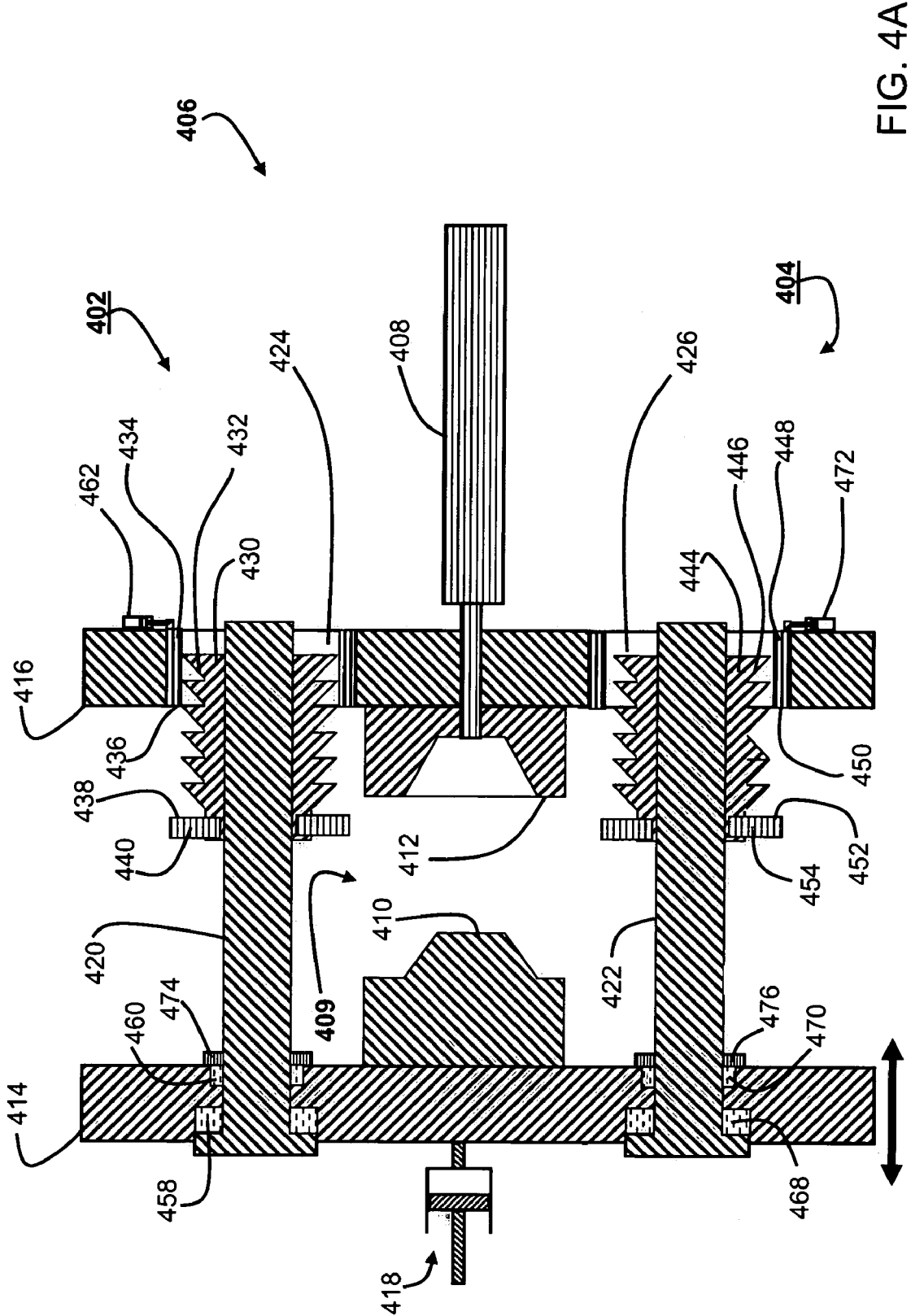
FIGS. 4A to 4C are views of a molding-system clamp assembly according to a ninth exemplary embodiment.
Figure 4B:
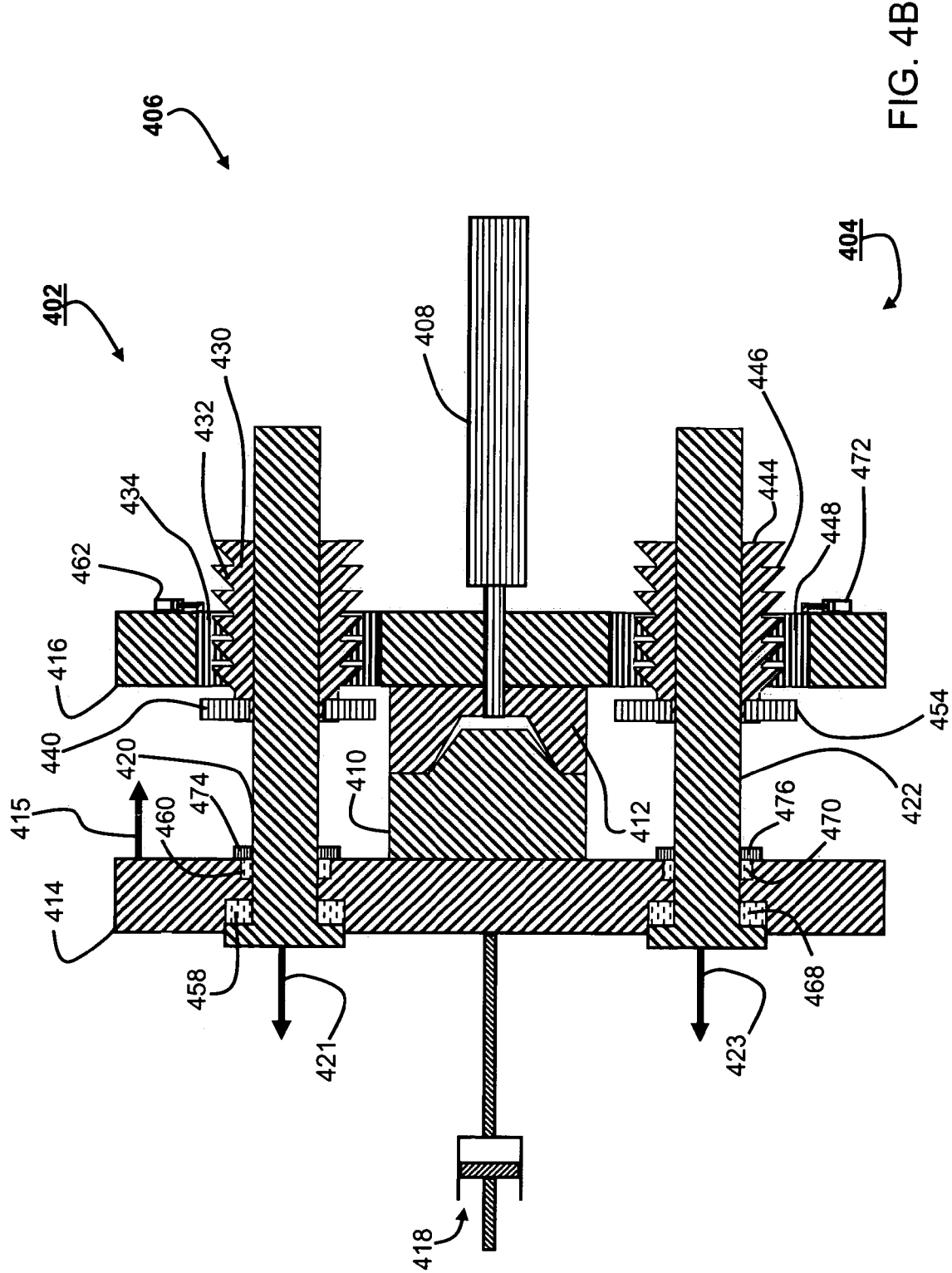
Figure 4C:
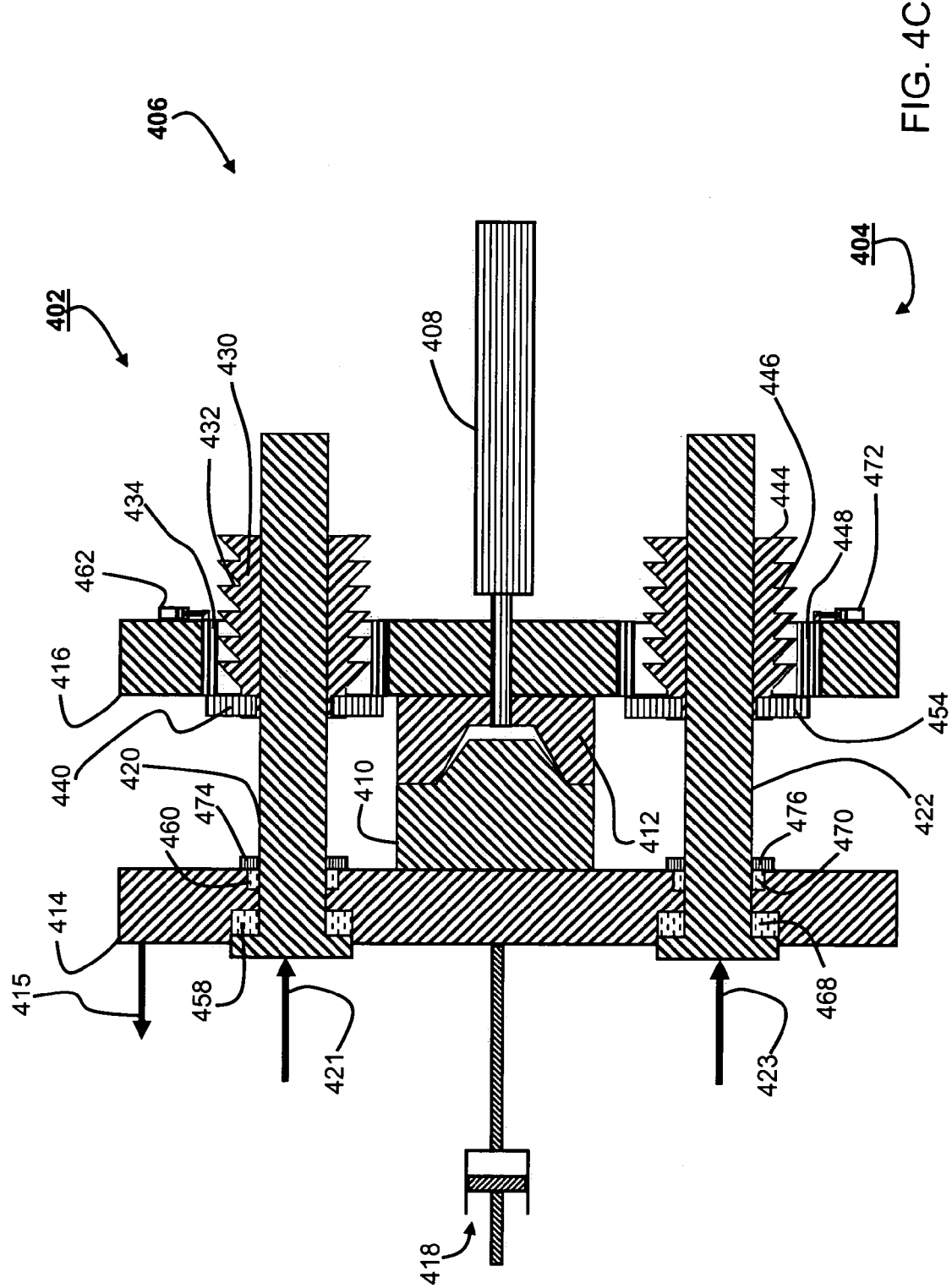

FIGS. 4A, 4B and 4C are views of molding-system clamp assemblies 402, 404 (hereafter referred to as the "clamp assemblies" 402, 404) according to the ninth exemplary embodiment.

FIG. 4A shows that the clamp assemblies 402, 404 are similar to each other. To facilitate an understanding of the ninth embodiment; elements of the ninth embodiment that are similar to those according to the eighth embodiment (as shown in FIGS. 3A and 3B) are identified by reference numerals that are differentiated from the reference numerals of the eighth embodiment by a four-hundred designation rather than a three-hundred designation. For example, the clamp ram of the ninth embodiment is labeled 430 rather than being labeled 330.

FIG. 4A shows that the clamp assemblies 402, 404 do not include clamp pistons respectively. The function of the clamp pistons 328, 342 of the eighth embodiment are incorporated into a movable platen 414 as explained below. Inter-meshable structures 434, 448 are depicted in FIG. 4A as being unmeshed from intermeshable structures 432, 446 respectively. However, the inter-meshable structures 434, 448 are depicted in FIG. 4B as being inter-meshed with the intermeshable structures 432, 446 respectively. The inter-meshable structures 434, 448 are attached to the stationary platen 416. The intermeshable structures 432, 446 are attached to tie bars 420, 422 respectively. The tie bars 420, 422 are configured differently that the tie bars 320, 322 of FIGS. 3A. 3B, in such as way that the movable platen 414 houses the clamping-hydraulic columns 458, 468 and the mold-break hydraulic columns 460, 470. The clamping-hydraulic columns 458, 468 are actuated to apply a clamping force to mold 409 (via the tie bars 420, 422). The mold-break hydraulic columns 460, 470 are actuated to apply a mold break force to the mold 409 (via the tie bars 420, 422). Caps 474, 476 are used to cover the mold-break hydraulic columns 460, 470 respectively.

The platen actuator 418 will be actuated to stroke the movable platen 414 toward a stationary platen 416 so that the mold halves 410, 412 may be closed against each other.

FIG. 4B shows the clamp assemblies 402, 404 actuated to apply a clamp force to the mold 409. The platen actuator 418 has stroked the movable platen 414 toward the stationary platen 416 until the mold halves 410, 412 have been closed against each another. Then, the inter-meshable structures 432, 434 were actuated to intermesh each other, and the inter-meshable structures 446, 448 were actuated to intermesh each other. Then, the mold-break hydraulic columns 460, 470 were deactuated while the clamping-hydraulic columns 458, 468 were actuated (pressurized) so that the clamping-hydraulic columns 458, 468 now act to pull the tie bar 420 away from the injection unit 408 (thus transmitting a clamping force which acts to pull the mold half 412 toward the mold half 410) and thus a clamping force is transmitted to a mold 409 (through or via the inter-meshable structures 432, 434 that are intermeshed, and via the inter-meshable structures 446, 448 that are intermeshed). The clamping-hydraulic columns 458, 468 will push the tie bars 420, 422 toward the platen actuator 418 along the directions indicated by the arrows 421, 423. The clamping-hydraulic columns 458, 468 will push the movable platen 414 along the direction indicated by an arrow 421.

FIG. 4C shows the clamp assemblies 402, 404 actuated to apply a mold break force to the mold 409. The inter-meshable structures 432, 434 were actuated to un-mesh from each other as well as the inter-meshable structures 446, 448 were actuated to un-mesh from each other. Then the clamping-hydraulic columns 458, 468 were de-pressurized and the mold-break hydraulic columns 460, 470 were pressurized so that the mold-break hydraulic columns 460, 470 act to push the movable platen 414 along the direction indicated by arrow 415, and also act to push the tie bars 420, 422 along the directions indicated by the arrows 421, 423. In effect, the interposing body 440 and the interposing 454 are moved to abut, in effect, the stationary platen 416 (and/or the inter-meshable structures 434, 448 which are attached to the stationary platen 416) so that in effect, the clamp-break force is transmitted to the mold halves 410, 412 from the mold-break hydraulic columns 460, 470 through or via the inter-abuttable structures 436, 438 and/or the stationary platen 416.

Generally, the inter-meshable structures 432, 434, in cooperation with inter-abuttable structures 436, 438, transfer a force to the mold 409. Preferably, the inter-meshable structures 432, 434 transfer a mold-clamping force over to the mold 409, and the inter-abuttable structures 436; 438 transfer a mold-break force over to the mold 409. A similar structure to that of the clamp assembly 402 is arranged for the clamp assembly 404.

Figure 5:
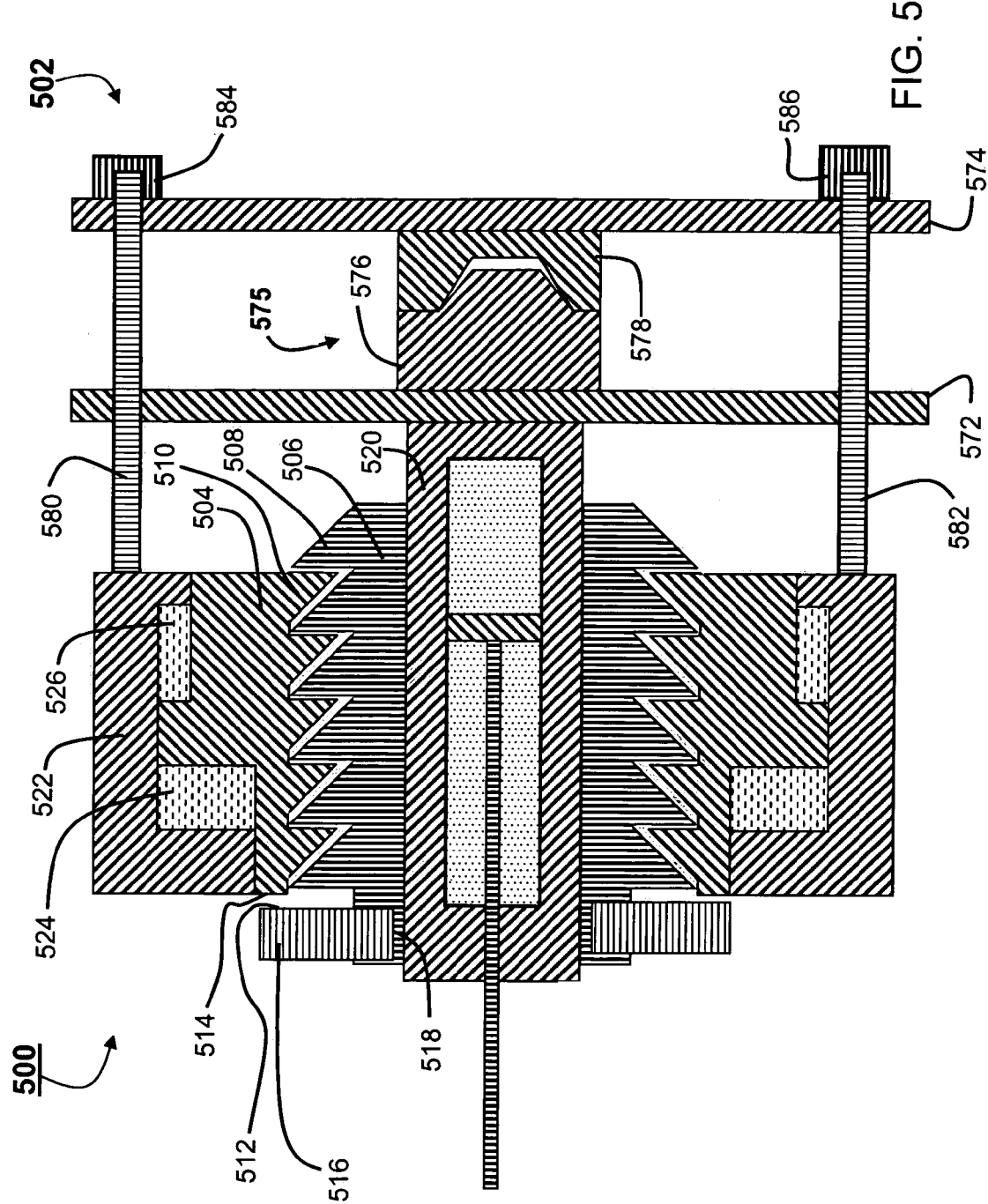
FIG. 5 is a view of a molding-system clamp assembly according to a tenth exemplary embodiment.

FIG. 5 is a view of a molding-system clamp assembly 500 (hereafter referred to as the "clamp assembly" 500) according to the tenth exemplary embodiment. To facilitate an understanding of the tenth embodiment, elements of the tenth embodiment that are similar to those according to the first embodiment (as shown in FIG. 2A) are identified by reference numerals that are differentiated from the reference numerals of the first embodiment by a five-hundred designation rather than a two-hundred designation. For example, the clamp ram for the tenth embodiment is labeled 506 rather than being labeled 206.

According to the tenth embodiment, the clamp assembly 500 is usable with a tie bar 580 and/or a tie bar 582. The tie bars 580, 582 are attached to a housing 522, are slidably mounted relative to a movable platen 572 and are attached to a stationary platen 574. Lock nuts 584, 586 attach the tie bars 580, 582 respectively to the stationary platen 574.

When inter-meshable structures 510, 508 are actuated to intermesh each other, and a clamping-hydraulic column 524 is pressurized (actuated) and a mold-break hydraulic column 526 is de-pressurized (de-actuated), the clamping-hydraulic column 524 acts to push the tie bar 580 toward the stationary platen 574 and also acts, to push a clamp ram 506 which then pushes the clamp column 520 toward the movable platen 572, and thus in effect a clamping force is transmitted to a mold 575 from the clamping-hydraulic column 524 through or via inter-meshable structures 510, 505 and the tie bars 580, 582. The mold 575 includes mold halves 576, 578.

When the inter-meshable structures 510, 508 are actuated to un-mesh from each other, and the clamping-hydraulic column 524 is de-pressurized and the mold-break hydraulic column 526 is pressurized, the mold-break hydraulic column 526 pushes the clamp ram 506 which in effect pushes the clamp column 520 away from the movable-platen 572 (and also pushes the tie bar 580 toward the stationary platen 574), and thus a clamp-break force is transmitted to the mold halves 576, 578 from the mold-break hydraulic column 526 through or via inter-abuttable structures 514, 512.

Generally, the inter-meshable structures 508, 510, in cooperation with inter-abuttable structures 512, 514, transfer a force to the mold 575. Preferably, the inter-meshable structures 508, 510 transfer a mold-clamping force over to the mold 575, and the inter-abuttable structures 512, 514 transfer a mold-break force over to the mold 575. It is understood that an inter-abuttable structure 512 includes teeth that have rear-tooth portions flank-tooth portions, and that an inter-abuttable structure 514 includes teeth that have rear-tooth portions flank-tooth portions.

Figure 6:
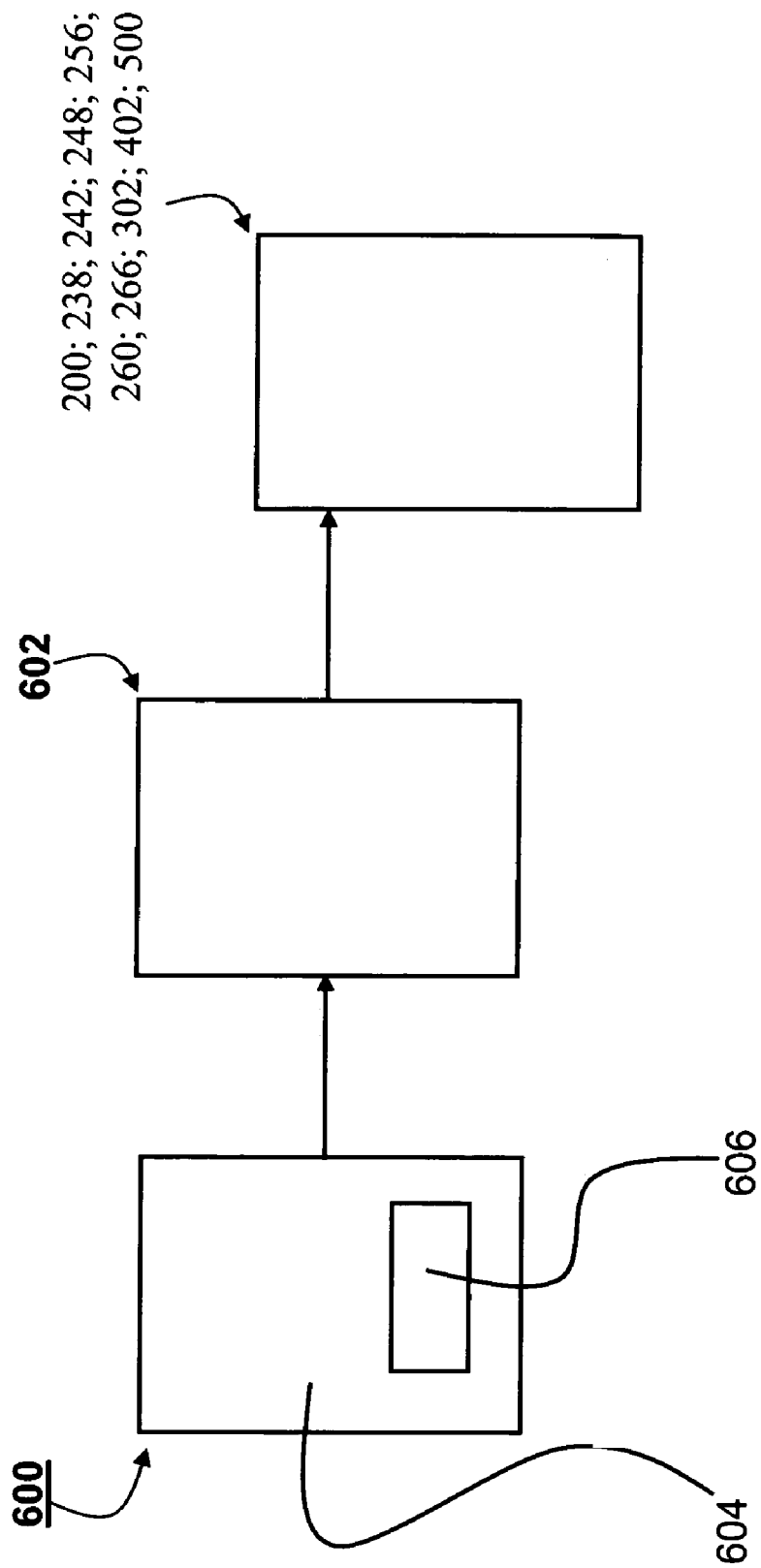
FIG. 6 is block schematic of an article of manufacture, according to an eleventh embodiment, used for directing a data processing system, according to a twelfth embodiment, to control a molding-system clamp assembly of FIGS. 1A to 5.

FIG. 6 is block schematic of an article of manufacture 600 used for directing a data processing system 602 to control a molding-system clamp assembly 200, 238, 242, 248, 256, 260, 266, 302, 402, 500 of FIGS. 1A to 5, respectively, according to an eleventh embodiment. The molding-system clamp assembly 200, 238, 242, 248, 256, 260, 266, 302, 402, 500 is operatively connectable to the data processing system 602. The article of manufacture 600 includes a data processing system usable medium 604 embodying one or more instructions 606 that are executable by the data processing system 602. The data processing system usable medium 604 may be a magnetic disk, an optical disk, a hard drive and/or RAM (Random Access Memory), etc. The data processing system usable medium 604 may also be a signal that carries the one or more instructions 606 over a network, such as the Internet, to the data processing system 602.

The one or more instructions 606 includes instructions for directing the data processing system 602 to actuate the inter-abuttable structures (212; 214; 336; 338; 436; 438; 512; 514), and also includes instructions for directing the data processing system 602 to actuate the inter-meshable structures (208; 210; 332; 334; 432; 434; 508; 510), the inter-abuttable structures (212; 214; 336; 338; 436; 438; 512; 514) configured to, in cooperation with the inter-meshable structures (205; 210; 332; 334; 432; 434; 505; 510), transfer a force to a mold (275; 309; 409; 575).

The one or more instructions 606 also includes, but is not limited to, the following (in no particular order):

instructions for directing the data processing system 602 to actuate the inter-meshable structures to be selectively inter-meshable;

instructions for directing the data processing system 602 to actuate the inter-abuttable structures to be selectively inter-abuttable;

instructions for directing the data processing system 602 to actuate the inter-meshable structures to transfer a mold-clamping force over to the mold;

instructions for directing the data processing system 602 to actuate the inter-abuttable structures to transfer a mold-break force over to the mold;

instructions for directing the data processing system 602 to actuate at least one of the inter-abuttable structures to be offset from any one of the inter-meshable structures;

instructions for directing the data processing system 602 to actuate the inter-abuttable structures of a ram surface defined by a clamp ram and of a piston surface defined by a clamp piston;

instructions for directing the data processing system 602 to actuate the inter-abuttable structures to include an interposing body;

instructions for directing the data processing system 602 to actuate a clamp ram to be abuttable against the interposing body;

instructions for directing the data processing system 602 to actuate a clamp piston to be abuttable against the interposing body.

instructions for directing the data processing system 602 to actuate the inter-meshable structures to selectively inter-mesh a clamp piston relative to a clamp ram;

instructions for directing the data processing system 602 to actuate the inter-abuttable structures to selectively inter-abut the clamp piston relative to the clamp ram;

instructions for directing the data processing system 602 to actuate the inter-meshable structures to selectively inter-mesh a platen relative to a clamp ram;

instructions for directing the data processing system 602 to actuate the inter-abuttable structures to selectively inter-abut the platen relative to the clamp ram;

instructions for directing the data processing system 602 to actuate the inter-meshable structures to selectively inter-mesh a clamp piston relative to the clamp ram;

instructions for directing the data processing system 602 to actuate the inter-abuttable structures to selectively inter-abut the clamp piston relative to the clamp ram, and wherein the clamp ram is connectable to a clamp column, the clamp ram is connectable to a platen;

instructions for directing the data processing system 602 to actuate a mold-break hydraulic column to be interactable with a clamping piston, the clamp piston housed in a housing, the mold-break hydraulic column to be housed in the housing;

instructions for directing the data processing system 602 to actuate a clamping-hydraulic column to be interactable with the clamping piston, the clamping-hydraulic column housed in the housing; and/or instructions for directing the data processing system to actuate a tie bar to attach to the housing, the tie bar slidably mounted relative to a movable platen, and tie bar attached to a stationary platen, wherein the inter-meshable structures are configured to selectively inter-mesh the clamp piston relative to a clamp ram, wherein the inter-abuttable structures are configured to selectively inter-abut the clamp piston relative to the clamp ram.

According to a twelfth eleventh embodiment, the data processing system 602 is provided for controlling the molding-system clamp assembly (200; 238; 242; 248; 256; 260; 266; 302; 402; 500) that is operatively connectable to the data processing system 602. The data processing system 602 includes a data processing system usable medium 604 embodying one or more instructions 606 executable by the data processing system 602.

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims:

What is claimed is:

1. A molding-system clamp assembly of a molding system, the molding system being configured to handle a mold, the molding-system clamp assembly comprising:
   a clamp piston being configured to apply a mold-clamping force to the mold that is being held shut by the molding system, and the clam piston being configured to remove the mold-clamping force from the mold after the mold becomes filled with a molding material and the molding material has cooled down and become solidified; and
   a clamp ram being movable relative to the clamp piston, the clamp ram and the clamp piston each including:
      inter-meshable structures being configured to selectively inter-mesh the clamp piston relative to the clamp ram, the inter-meshable structures being inter-meshing with each other so that the clamp piston and the clamp ram intermesh relative to each other, once the inter-meshable structures do not interfere with each other while the mold remains not yet been broken apart, the clamp piston is movable, the inter-meshable structures being configured to be movable to an unmeshed position, in the unmeshed position the clamp piston and the clamp ram do not inter-mesh relative to each other; and
      inter-abuttable structures being configured to selectively inter-abut the clamp piston relative to the clamp ram, at least one of the inter-abuttable structures having an interposing body, the interposing body being abuttable against the clamp ram, and the interposing body being abuttable against the clamp piston, the inter-abuttable structures being configured to abut with each other so that the clamp piston makes contact with the interposing body, and the inter-abuttable structures being configured to transfer a mold-break force so that the mold-break force is applied from the clamp piston against the interposing body, and in response the mold-break force is transferred from the clamp piston through the interposing body and to the clamp ram, and once mold break has occurred, the clamp piston is deactivated so that the mold may be opened.

2. The molding-system clamp assembly of claim 1, wherein:
   the inter-abuttable structures include:
   a ram surface defined by the clamp ram; and
   a piston surface defined by the clamp piston.

3. The molding-system clamp assembly of claim 1, wherein:
   the inter-meshable structures are configured to selectively inter-mesh a platen relative to the clamp ram, and
   the inter-abuttable structures are configured to selectively inter-abut the platen relative to the clamp ram.

4. The molding-system clamp assembly of claim 1, further comprising:
   a housing being configured to house the clamp piston;
   a clamping-hydraulic column housed in the housing and being interactable with the clamp piston; and
   a mold-break hydraulic column being housed in the housing, and being interactable with the clamp piston; and
   a tie bar being attached to the housing, the tie bar slidably mounted relative to a movable platen, and the tie bar being attached to a stationary platen, wherein the inter-meshable structures are configured to selectively inter-mesh the clamp piston relative to the clamp ram, wherein the inter-abuttable structures are configured to selectively inter-abut the clamp piston relative to the clamp ram.

5. A molding system being configured to handle a mold, the molding system comprising:
   a molding-system clamp assembly, including:
      a clamp piston being configured to apply a mold-clamping force to the mold that is being held shut by the molding system, and the clamp piston being configured to remove the mold-clamping force from the mold after the mold becomes filled with a molding material and the molding material has cooled down and become solidified; and
      a clamp ram being movable relative to the clamp piston, the clamp ram and the clamp piston each including:
         inter-meshable structures being configured to selectively inter-mesh the clamp piston relative to the clamp ram, the inter-meshable structures being intermeshing with each other so that the clamp piston and the clamp ram intermesh relative to each other, once the inter-meshable structures do not interfere with each other while the mold remains not yet been broken apart, the clamp piston is movable, the inter-meshable structures being configured to be movable to an unmeshed position, in the unmeshed position the clamp piston and the clamp ram do not inter-mesh relative to each other; and
         inter-abuttable structures being configured to selectively inter-abut the clamp piston relative to the clamp ram, at least one of the inter-abuttable structures having an interposing body, the interposing body being abuttable against the clamp ram, and the interposing body being abuttable against the clamp piston, the inter-abuttable structures being configured to abut with each other so that the clamp piston makes contact with the interposing body, and the inter-abuttable structures being configured to transfer a mold-break force so that the mold-break force is applied from the clamp piston against the interposing body, and in response the mold-break force is transferred from the clamp piston through the interposing body and to the clamp ram, and once mold break has occurred, the clamp piston is deactivated so that the mold may be opened.

6. The molding system of claim 5, wherein:
   the inter-abuttable structures include:
   a ram surface defined by the clamp ram; and
   a piston surface defined by the clamp piston.

7. The molding system of claim 5, wherein:
   the inter-meshable structures are configured to selectively inter-mesh a platen relative to the clamp ram, and
   the inter-abuttable structures are configured to selectively inter-abut the platen relative to the clamp ram.

8. The molding system of claim 5, further comprising:
   a housing being configured to house the clamp piston;
   a clamping-hydraulic column being housed in the housing, and being interactable with the clamp piston; and
   a mold-break hydraulic column being housed in the housing, and being interactable with the clamp piston; and
   a tie bar being attached to the housing, the tie bar slidably mounted relative to a movable platen, and the tie bar being attached to a stationary platen, wherein the inter-meshable structures are configured to selectively inter-mesh the clamp piston relative to the clamp ram, wherein the inter-abuttable structures are configured to selectively inter-abut the clamp piston relative to the clamp ram.

9. A method of operating a molding-system clamp assembly of a molding system, the molding system having a mold, the molding-system clamp assembly having a clamp ram and a clamp piston each including inter-abuttable structures and inter-meshable structures, the clamp ram being movable relative to the clamp piston, the inter-meshable structures being configured to selectively inter-mesh the clamp piston relative to the clamp ram, the inter-abuttable structures being configured to selectively inter-abut the clamp piston relative to the clamp ram, at least one of the inter-abuttable structures having an interposing body, the interposing body being abuttable against the clamp ram, and the interposing body being abuttable against the clamp piston, the method comprising:

intermeshing the inter-meshable structures with each other so that the clamp piston and the clamp ram intermesh relative to each other;

actuating the clamp piston to apply a mold-clamping force to the mold that is being held shut by the molding system;

deactivating the clamp piston so as to remove the mold-clamping force from the mold after the mold is filled with a molding material and the molding material has cooled down and become solidified;

moving the clamp piston so that the inter-meshable structures do not interfere with each other and the mold remains not yet been broken apart;

moving the inter-meshable structures to an unmeshed position, in the unmeshed position the clamp piston and the clamp ram do not inter-mesh relative to each other;

abutting the inter-abuttable structures with each other so that the clamp piston makes contact with the interposing body; and transferring, via the inter-abuttable structures, a mold-break force so that the mold-break force is applied from the clamp piston against the interposing body, and in response the mold-break force is transferred from the clamp piston through the interposing body and to the clamp ram, and once mold break has occurred, the clamp piston is deactivated so that the mold may be opened.

10. The method of claim 9, further comprising:
configuring the inter-abuttable structures to include:
   a ram surface defined by the clamp ram; and
   a piston surface defined by the clamp piston.

11. The method of claim 9, further comprising:
configuring the inter-meshable structures to selectively inter-mesh a platen relative to the clamp ram; and
configuring the inter-abuttable structures to selectively inter-abut the platen relative to the clamp ram.

12. The method of claim 9, further comprising:
configuring a mold-break hydraulic column to be inter-actable with the clamp piston, the clamp piston housed in a housing, the mold-break hydraulic column to be housed in the housing;
configuring a clamping-hydraulic column to be inter-actable with the clamp piston, the clamping-hydraulic column being housed in the housing; and
configuring a tie bar to attach to the housing, the tie bar slidably mounted relative to a movable platen, and the tie bar being attached to a stationary platen, wherein the inter-meshable structures are configured to selectively inter-mesh the clamp piston relative to the clamp ram, wherein the inter-abuttable structures are configured to selectively inter-abut the clamp piston relative to the clamp ram.

* * * * *